(12) United States Patent
Damnjanovic et al.

(10) Patent No.: US 9,474,067 B2
(45) Date of Patent: Oct. 18, 2016

(54) WLAN UPLINK SCHEDULER FOR LTE-WLAN AGGREGATION

(71) Applicant: QUALCOMM Incorporated, San Diego, CA (US)

(72) Inventors: Jelena Damnjanovic, Del Mar, CA (US); Yongbin Wei, San Diego, CA (US); Fang Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 247 days.

(21) Appl. No.: 14/225,153

(22) Filed: Mar. 25, 2014

(65) Prior Publication Data

US 2014/0293970 A1  Oct. 2, 2014

Related U.S. Application Data

(60) Provisional application No. 61/805,420, filed on Mar. 26, 2013.

(51) Int. Cl.
| | |
|---|---|
| *H04J 3/00* | (2006.01) |
| *H04W 72/04* | (2009.01) |
| *H04L 5/00* | (2006.01) |
| *H04W 72/12* | (2009.01) |
| *H04W 84/12* | (2009.01) |
| *H04W 88/06* | (2009.01) |

(52) U.S. Cl.
CPC ........ *H04W 72/0446* (2013.01); *H04L 5/0044* (2013.01); *H04L 5/0078* (2013.01); *H04W 72/1215* (2013.01); *H04L 5/0087* (2013.01); *H04W 84/12* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 7,428,428 B2 * | 9/2008 | Wong | H04B 7/2606 455/560 |
| 2004/0185892 A1 * | 9/2004 | Iacono | H04L 47/2433 455/522 |

(Continued)

FOREIGN PATENT DOCUMENTS

| | | |
|---|---|---|
| WO | WO-2012039656 A1 | 3/2012 |
| WO | WO 2012140314 A1 | 10/2012 |

OTHER PUBLICATIONS

Intel Corporation, "Discussions on Carrier Aggregation Across LTE and WiFi," 3GPP TSG-RAN meeting #53, Agenda Item 13.2.1, RP-111094, XP-002725489, Sep. 13-16, 2011, Fukuoka, JP, 4 pgs.

(Continued)

*Primary Examiner* — Faruk Hamza
*Assistant Examiner* — Shah R Zaman
(74) *Attorney, Agent, or Firm* — Holland & Hart LLP

(57) ABSTRACT

Techniques for improving uplink throughput of UE uplink transmissions are disclosed. The UE may communicate with an eNB over an LTE wireless link using a first radio, and with a WLAN access point over a WLAN wireless link using a second radio. The UE may schedule a first portion of uplink data from an aggregating layer of the UE for transmission over the WLAN wireless link during a scheduling window, the scheduling based on an availability of access to the LTE wireless link. The UE may transmit the first portion of the uplink data over the WLAN wireless link during the scheduling window. The aggregation of the LTE wireless link with the WLAN wireless link may allow the UE to transmit uplink data from the aggregating layer of the UE over both the LTE wireless link or the WLAN wireless link.

27 Claims, 13 Drawing Sheets

(56) References Cited

U.S. PATENT DOCUMENTS

| | | | |
|---|---|---|---|
| 2007/0070926 A1* | 3/2007 | Bachl | H04L 1/0025 370/310 |
| 2008/0220787 A1* | 9/2008 | Stanwood | H04B 7/02 455/450 |
| 2009/0046650 A1* | 2/2009 | Dalsgaard | H04L 1/1812 370/329 |
| 2011/0002262 A1* | 1/2011 | Wang | H04L 1/1812 370/328 |
| 2012/0093009 A1 | 4/2012 | Wang et al. | |
| 2012/0164948 A1 | 6/2012 | Narasimha et al. | |
| 2013/0188552 A1* | 7/2013 | Kazmi | H04L 5/001 370/315 |
| 2013/0242897 A1* | 9/2013 | Meylan | H04W 28/16 370/329 |
| 2013/0272260 A1* | 10/2013 | Bitran | H04W 16/14 370/329 |
| 2013/0273857 A1 | 10/2013 | Zhang et al. | |
| 2014/0050086 A1* | 2/2014 | Himayat | H04N 21/2365 370/230 |

OTHER PUBLICATIONS

ISA/EPO, International Search Report and Written Opinion of the International Searching Authority, Int'l App. No. PCT/US2014/031841, Jun. 26, 2014, European Patent Office, Rijswijk, NL, 12 pgs.

Wang et al., "Hybrid Uplink Scheduling in an Integrated 3G/WLAN Network with Relaying," Proceedings of the 25th IEEE International Conference on Distributed Computing Systems Workshops (ICDCSW 2005 Workshops), Jun. 6-10, 2005, Columbus, Ohio, US, 6 pgs.

* cited by examiner

WLAN UPLINK SCHEDULER FOR LTE-WLAN AGGREGATION

CROSS REFERENCES

The present application for Patent claims priority to U.S. Provisional Patent Application No. 61/805,420 by Damnjanovic et al., entitled "WLAN Uplink Scheduler for LTE-WLAN Aggregation," filed Mar. 26, 2013, assigned to the assignee hereof, and expressly incorporated by reference herein.

BACKGROUND

The following relates generally to wireless communication, and more specifically to the concurrent use of multiple resource access technologies to communicate with a wireless network. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple mobile devices. Base stations may communicate with mobile devices on downstream and upstream links. In some wireless networks, a user equipment (UE) may be capable of supporting multiple resource access technologies concurrently. For example, a UE may simultaneously transmit data over a wireless local area network (WLAN) link and a Long Term Evolution (LTE) link. In traditional systems, uplink resources for a UE on the LTE link may be controlled by an eNodeB (eNB). On the other hand, access to WLAN resources is traditionally collision-based, and no such scheduling occurs. Thus, when a UE is concurrently connected to WLAN and LTE wireless links and has uplink data to transmit, there may be a need to determine the amount of uplink data to transmit over the LTE link and the WLAN link respectively.

SUMMARY

The described features generally relate to one or more improved systems, methods, and/or apparatuses for managing uplink transmissions of a UE that is capable of communicating with a wireless communications system over LTE and WLAN wireless links simultaneously. The UE may communicate with an eNodeB (eNB) over an LTE wireless link using a first radio of the UE and communicate with a wireless local area network (WLAN) access point over a WLAN wireless link using a second radio of the UE. The UE may schedule a first portion of uplink data from a layer of the UE to transmit over the WLAN wireless link during a WLAN scheduling window. The scheduling may be based at least in part on a state of the LTE wireless link including the availability of an uplink grant. The UE may transmit the first portion of the uplink data over the WLAN wireless link during the scheduling window according to an aggregation of the LTE wireless link with the WLAN wireless link. In this way, a single layer (i.e. an aggregating layer) may provide data for transmission over both the LTE wireless link and the WLAN wireless link, and the UE may distribute data from the single layer between the LTE wireless link and the WLAN wireless link. Because the distribution may be based on the state or condition of the LTE wireless link, the overall uplink throughput of the UE may increase.

According to a first set of illustrative examples, a method of managing uplink transmissions of a user equipment (UE) may include: communicating with an eNodeB (eNB) over an LTE wireless link using a first radio of the UE; communicating with a wireless local area network (WLAN) access point over a WLAN wireless link using a second radio of the UE; scheduling at the UE a first portion of uplink data from an aggregating layer of the UE for transmission over the WLAN wireless link during a scheduling window, the scheduling based at least in part on a availability of access to the LTE wireless link; and transmitting the first portion of the uplink data over the WLAN wireless link during the scheduling window according to an aggregation of the LTE wireless link with the WLAN wireless link. The disclosed aggregating layer may be coupled to a first MAC entity associated with the LTE wireless link and a second MAC entity associated with the WLAN wireless link and may provide the uplink data to the first MAC entity and the second MAC entity. The aggregating layer may also be coupled to a scheduler of the UE which may coordinate scheduling of the uplink data over one or more of the LTE wireless link and the WLAN wireless link. The aggregating layer may comprise an LTE Radio Link Control (RLC) layer of the UE.

In certain examples, the UE may transmit a second portion of the uplink data from the aggregating layer of the UE over the LTE wireless link during the scheduling window according to the aggregation of the LTE wireless link with the WLAN wireless link. The UE may further determine that the scheduling window coincides with a grant of uplink resources for the LTE wireless link by the eNB, and build at least one packet for transmission over the LTE wireless link according to the grant before the scheduling the first portion of the uplink data for transmission over the WLAN wireless link, wherein the building is in response to the determination.

In certain examples, scheduling the first portion of the uplink data for transmission over the WLAN wireless link may include determining a maximum estimated buffer size for each of a plurality of logical channels associated with the uplink data and determining an amount of the uplink data for transmission over the WLAN wireless link during the scheduling window for each of the logical channels. The amount may be determined based at least in part on the maximum estimated buffer size determined for that logical channel.

In certain examples, the UE may set an upper bound on the maximum estimated buffer size determined for at least one of the logical channels based on a maximum total buffer threshold of the WLAN transmit buffer and at least one or more of: an amount of data provisioned for transmission from the at least one of the logical channels or a number of packets provisioned for transmission from the at least one of the logical channels.

In certain examples, the UE may determine a tentative amount of the uplink data to push into a WLAN transmit buffer of the UE for each one of the logical channels based on the determined maximum estimated buffer size for that one of the logical channels and a token bucket level associated with that WLAN buffer. The UE may then determine whether to transmit the tentative amount of the uplink data for each one of the logical channels over the WLAN wireless link based on a prioritization between the LTE wireless link and the WLAN wireless link associated with that one of the logical channels during the scheduling window.

In certain examples, determining the prioritization between the WLAN wireless link and the LTE wireless link for each of the logical channels during the scheduling window may be based on a difference in a total estimated delay of transmitting a total amount of available data for that logical channel over the LTE wireless link and a total estimated delay of transmitting the total amount of available data over the aggregation of the LTE wireless link and the WLAN wireless link according to the determined tentative amount.

In certain examples, the first portion of the uplink data from the aggregating layer of the UE may be added to at least one WLAN transmit buffer of the UE.

In certain examples, the UE may determine that a time period of the scheduling window has expired and/or that a size of at least one WLAN buffer of the UE has crossed a threshold, and the scheduling the first portion of the uplink data to transmit over the WLAN wireless link may occur in response to the expiration of the scheduling window time period or in response to the size of the at least one WLAN buffer crossing the threshold.

According to a second set of illustrative examples, an apparatus for managing uplink transmissions of a user equipment (UE) may include means for communicating with an eNodeB (eNB) over an LTE wireless link; means for communicating with a wireless local area network (WLAN) access point over a WLAN wireless link; means for scheduling at the UE a first portion of uplink data from an aggregating layer of the UE to transmit over the WLAN wireless link during a scheduling window, the scheduling based at least in part on a availability of access to the LTE wireless link; and means for transmitting the first portion of the uplink data over the WLAN wireless link during the scheduling window according to an aggregation of the LTE wireless link with the WLAN wireless link. The disclosed aggregating layer may be coupled to a first MAC entity associated with the LTE wireless link and a second MAC entity associated with the WLAN wireless link and may provide the uplink data to the first MAC entity and the second MAC entity. The aggregating layer may also be coupled to a scheduler of the UE which may coordinate scheduling of the uplink data over one or more of the LTE wireless link and the WLAN wireless link. The aggregating layer may comprise an LTE Radio Link Control (RLC) layer of the UE.

In certain examples, the apparatus may include means for transmitting a second portion of the uplink data from the aggregating layer of the UE over the LTE wireless link during the scheduling window according to the aggregation of the LTE wireless link with the WLAN wireless link. The apparatus may further include means for determining that the scheduling window coincides with a grant of uplink resources for the LTE wireless link by the eNB, and means for building at least one packet for transmission over the LTE wireless link according to the grant before the scheduling the first portion of the uplink data to transmit over the WLAN wireless link, wherein the building is in response to the determination.

In certain examples, the means for scheduling the first portion of the uplink data to transmit over the WLAN wireless link may include means for determining a maximum estimated buffer size for each of a plurality of logical channels associated with the uplink data and determining an amount of the uplink data to transmit over the WLAN wireless link during the scheduling window for each of the logical channels. The amount may be determined based at least in part on the maximum estimated buffer size determined for that logical channel.

In certain examples, the apparatus may include means for setting an upper bound on the maximum estimated buffer size determined for at least one of the logical channels based on a maximum total buffer threshold of the WLAN transmit buffer and at least one or more of: an amount of data provisioned for transmission from the at least one of the logical channels or a number of packets provisioned for transmission from the at least one of the logical channels.

In certain examples, the apparatus may include means for determining a tentative amount of the uplink data to push into a WLAN transmit buffer of the UE for each one of the logical channels based on the determined maximum estimated buffer size for that one of the logical channels and a token bucket level associated with that WLAN buffer. The apparatus may further include means for determining whether to transmit the tentative amount of the uplink data for each one of the logical channels over the WLAN wireless link based on a prioritization between the LTE wireless link and the WLAN wireless link associated with that one of the logical channels during the scheduling window.

In certain examples, the apparatus may include means for determining the prioritization between the WLAN wireless link and the LTE wireless link for each of the logical channels during the scheduling window may be based on a difference in a total estimated delay of transmitting a total amount of available data for that logical channel over the LTE wireless link and a total estimated delay of transmitting the total amount of available data over the aggregation of the LTE wireless link and the WLAN wireless link according to the determined tentative amount.

In certain examples, the apparatus may include means for adding the first portion of the uplink data from the layer of the UE to at least one WLAN transmit buffer of the UE.

According to a third set of illustrative embodiments, a user equipment (UE) may include a first radio configured to communicate with an eNodeB (eNB) over an LTE wireless link, a second radio configured to communicate with a wireless local area network (WLAN) access point over a WLAN wireless link, and a scheduler configured to schedule a first portion of uplink data from an aggregating layer of the UE to transmit over the WLAN wireless link during a scheduling window, the scheduling based at least in part on availability of access to the LTE wireless link. The first radio may be further configured to transmit the first portion of the uplink data over the WLAN wireless link during the scheduling window according to an aggregation of the LTE wireless link with the WLAN wireless link. The disclosed aggregating layer may be coupled to a first MAC entity associated with the LTE wireless link and a second MAC entity associated with the WLAN wireless link and may provide the uplink data to the first MAC entity and the second MAC entity. The aggregating layer may also be coupled to a scheduler of the UE which may coordinate scheduling of the uplink data over one or more of the LTE wireless link and the WLAN wireless link. The aggregating layer may comprise an LTE Radio Link Control (RLC) layer of the UE.

In certain examples, the second radio may be configured to transmit a second portion of the uplink data from the aggregating layer of the UE over the LTE wireless link during the scheduling window according to the aggregation of the LTE wireless link with the WLAN wireless link. The scheduler may further determine that the scheduling window coincides with a grant of uplink resources for the LTE wireless link by the eNB, and build at least one packet at the aggregating layer of the UE for transmission over the LTE wireless link according to the grant before the scheduling the first portion of the uplink data to transmit over the WLAN wireless link, wherein the building is in response to the determination.

In certain examples, the scheduler may be further configured to determine a maximum estimated buffer size for each of a plurality of logical channels associated with the uplink data and determine an amount of the uplink data to transmit over the WLAN wireless link during the scheduling window for each of the logical channels. The amount may be determined based at least in part on the maximum estimated buffer size determined for that logical channel.

In certain examples, the scheduler may be further configured to set an upper bound on the maximum estimated buffer size determined for at least one of the logical channels based on a maximum total buffer threshold of the WLAN transmit buffer and at least one or more of: an amount of data provisioned for transmission from the at least one of the logical channels or a number of packets provisioned for transmission from the at least one of the logical channels.

In certain examples, the scheduler may be further configured to may determine a tentative amount of the uplink data to push into a WLAN transmit buffer of the UE for each one of the logical channels based on the determined maximum estimated buffer size for that one of the logical channels and a token bucket level associated with that WLAN buffer. The UE may then determine whether to transmit the tentative amount of the uplink data for each one of the logical channels over the WLAN wireless link based on a prioritization between the LTE wireless link and the WLAN wireless link associated with that one of the logical channels during the scheduling window.

In certain examples, the scheduler may be further configured to determine the prioritization between the WLAN wireless link and the LTE wireless link for each of the logical channels during the scheduling window based on a difference in a total estimated delay of transmitting a total amount of available data for that logical channel over the LTE wireless link and a total estimated delay of transmitting the total amount of available data over the aggregation of the LTE wireless link and the WLAN wireless link according to the determined tentative amount.

In certain examples, the scheduling module may be further configured to add the first portion of the uplink data from the aggregating layer of the UE to at least one WLAN transmit buffer of the UE.

In certain examples, the scheduler may be further configured to determine that a time period of the scheduling window has expired and/or that a size of at least one WLAN buffer of the UE has crossed a threshold, and the scheduling the first portion of the uplink data to transmit over the WLAN wireless link may occur in response to the expiration of the scheduling window time period or in response to the size of the at least one WLAN buffer crossing the threshold.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The present description discloses methods, systems, apparatuses, and computer program products for managing uplink transmissions of a user equipment (UE) that is capable of communicating with a wireless communications system over simultaneous LTE and WLAN wireless links. The disclosed methods, systems, apparatuses, and computer programs provide for layer aggregation and uplink transmission of the UE data according to the aggregation. In the case of radio link control (RLC) aggregation, data belonging to an LTE bearer may be scheduled on the LTE wireless link, the WLAN wireless link, or both links at the same time. While an eNB associated with the LTE wireless link may control LTE uplink scheduling, the UE may strategically schedule uplink communications over the WLAN wireless link to increase an overall data throughput and improve user experience.

According to the principles of the present description, the UE may schedule uplink transmissions over the WLAN wireless link on a periodic and/or event-based basis. In the case of periodic scheduling, at least some of the scheduling intervals for the uplink WLAN transmissions may align with LTE scheduling. Using layer aggregation, the LTE and WLAN wireless links may be integrated such that the UE may selectively utilize the LTE and WLAN wireless links to transmit uplink LTE bearers. Specifically, the UE may, for each of a number of logical channels and for each scheduling interval, determine an amount of data to be transmitted over the WLAN wireless link rather than over uplink LTE resources granted to the UE. The UE may determine the amount to be transmitted based at least in part on a state of the LTE wireless link (e.g. availability of access to the LTE wireless link).

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
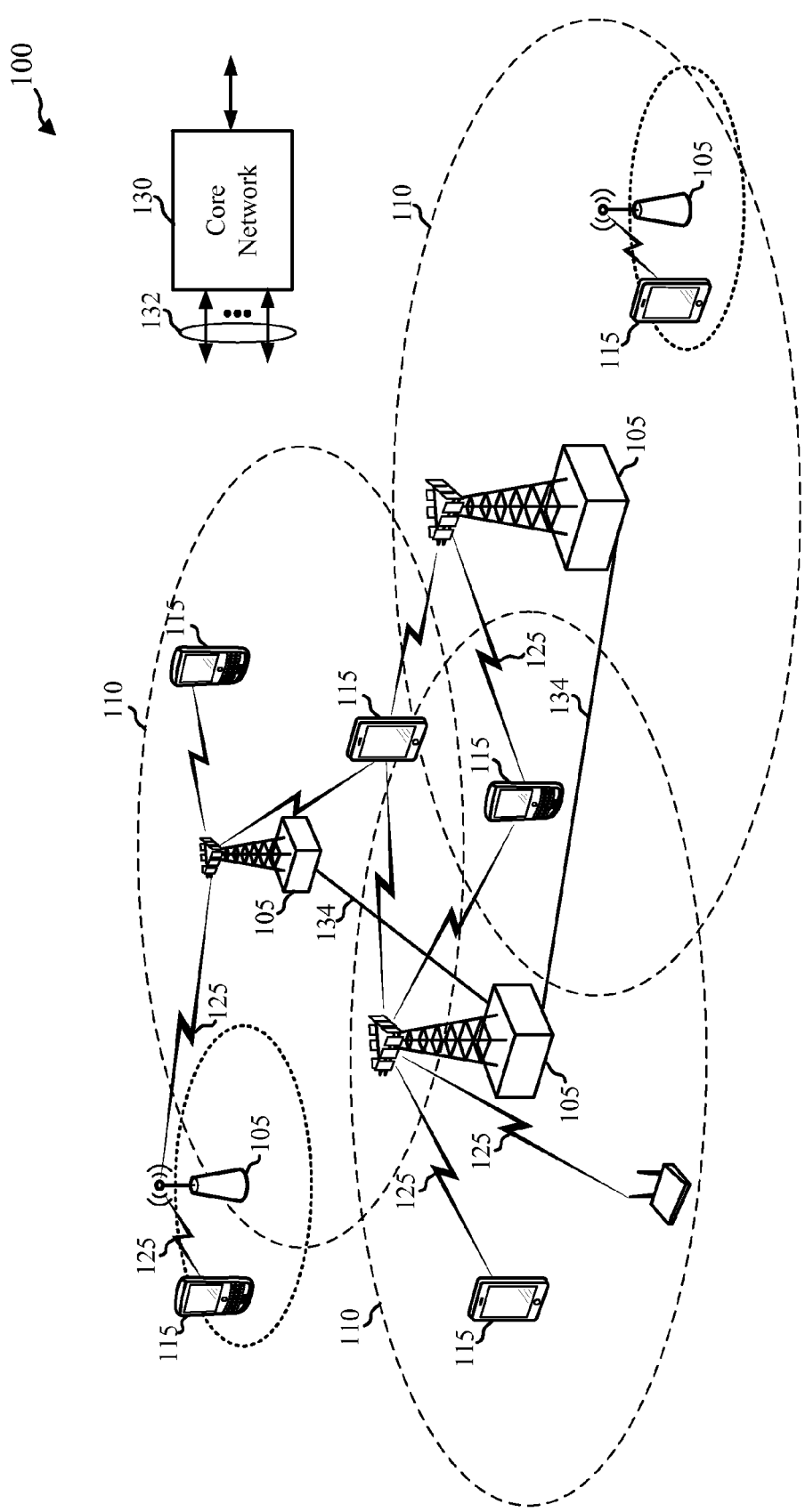
FIG. 1 shows a diagram of an illustrative wireless communications system.

Referring first to FIG. 1, a diagram illustrates an example of a wireless communications system 100. The wireless communications system 100 may include base stations (or cells) 105, UEs 115, and a core network 130. The base stations 105 may communicate with the UEs 115 under the control of a base station controller (not shown), which may be part of the core network 130 or the base stations 105 in various examples. Base stations 105 may communicate control information and/or user data with the core network 130 through backhaul links 132. In some examples, the base stations 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each wireless link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the UEs 115 via one or more base station antennas. Each of the base station 105 sites may provide communication coverage for a respective geographic coverage area 110. In some examples, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The geographic coverage area 110 for a base station may be divided into sectors making up only a portion of the coverage area (not shown). The wireless communications system 100 may include base stations 105 of different types (e.g., macro, micro, and/or pico base stations). There may be overlapping coverage areas for different technologies.

In examples, the wireless communications system 100 may be an LTE/LTE-A network. In LTE/LTE-A networks, the terms evolved Node B (eNB) and user equipment (UE) may be generally used to describe the base stations 105 and UEs 115, respectively. The wireless communications system 100 may be a Heterogeneous LTE/LTE-A network in which different types of eNBs provide coverage for various geographical regions. For example, each eNB 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 via a backhaul links 132 (e.g., S1, etc.). The eNBs 105 may also communicate with one another, e.g., directly or indirectly via backhaul links 134 (e.g., X2, etc.) and/or via backhaul links 132 (e.g., through core network 130). The wireless communications system 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for either synchronous or asynchronous operations.

The UEs 115 are dispersed throughout the wireless communications system 100, and each UE may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a handheld device, a tablet computer, a laptop computer, a cordless phone, a wireless local loop (WLL) station, or the like. A UE may be able to communicate with macro eNBs, pico eNBs, femto eNBs, relays, and the like.

The wireless links 125 shown in the wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions.

In certain examples, heterogeneous radio access technologies (RAT) may be available within the wireless communications system such that the UEs 115 may access the core network 130 over one or more different RATs. For example, the base stations 105 of the wireless communications system 100 may include both LTE eNBs 105 and WLAN access points. In certain examples, one or more LTE eNBs 105 may be collocated with one or more WLAN access points 105.

Certain UEs 115 may support LTE-WLAN carrier (or link) aggregation that allows the UEs 115 to communicate simultaneously with the eNB and the WLAN access points using a common layer of the UEs. As discussed herein, the common layer of the UE, also referred to as an aggregating layer, is responsible for aggregating uplink data for the various links so that the UEs supporting LTE-WLAN link aggregation may selectively utilize one of the RATs to transmit packets to the network (e.g. core network 130). As will be described in more detail with respect to the following Figures, a UE 115 supporting the LTE-WLAN link aggregation may be capable of periodically or aperiodically scheduling the transmission of packets related to, for example, LTE bearers over a WLAN wireless link instead of over an LTE wireless link.

In one example, at each of a number of scheduling instances for the WLAN wireless link, the UE 115 may determine an amount of data to put into at least one WLAN transmit buffer associated with one of a multiple logical channels based at least in part on a state of the LTE wireless link. For example, the amount of data to transmit on WLAN may be reduced by the amount of uplink resources granted by the eNB for LTE transmission. This scheduling may be an iterative process, in which an amount of data to be transmitted over WLAN may be separately determined for each of the logical channels at each scheduling instance. Upon determining an amount of data for a specific logical channel, a WLAN uplink scheduler may request an appropriate number of packets from an aggregating layer of the UE and place the packets into a WLAN transmit buffer associated with that logical channel.

Figure 2:
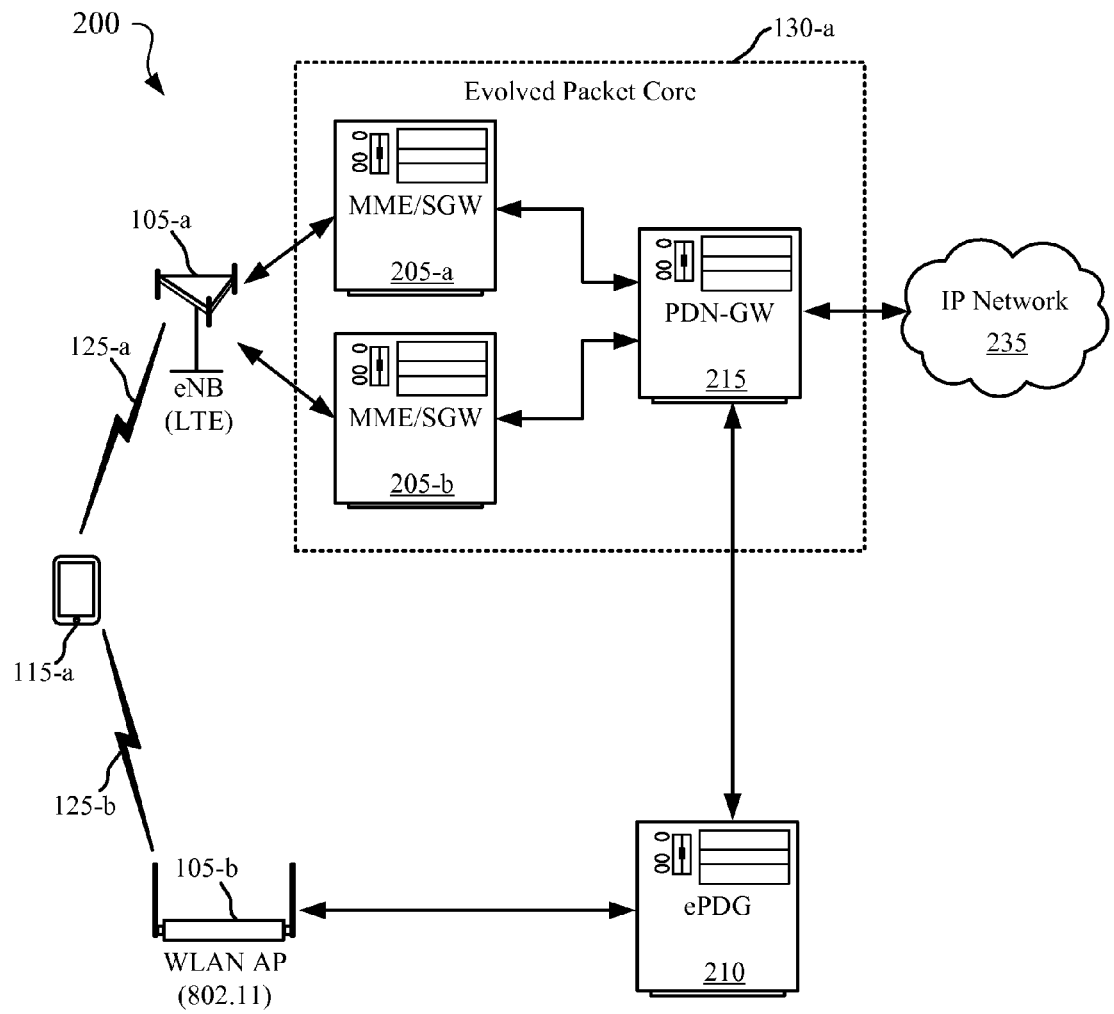
FIG. 2 shows a block diagram of an illustrative wireless communications system that includes multiple radio access technologies (RATs)

Referring now to FIG. 2, a diagram of a wireless communications system 200 is shown. The example wireless communications system 200 may include a UE 115-a, an eNB 105-a, a WLAN access point 105-b, an evolved packet core (EPC) 130-a, an evolved packet data gateway (ePDG) 210, and an IP network 235. The eNB 105-a and WLAN access point 105-b may each be an example of one of the base stations 105 of FIG. 1.

The eNB 105-a and WLAN access point 105-b may be capable of providing the UE 115-a with access to the evolved packet core 130-a using different RATs. Specifically, the eNB 105-a may provide access to the evolved packet core 130-a over LTE access technology, and the WLAN access point 105-b may provide access to the evolved packet core 130-a over WLAN access technology defined by the 802.11 standard from the Institute of Electrical and Electronic Engineers (IEEE).

The evolved packet core 130-a may include a number of mobility management entity/serving gateway (MME/SGW) devices 205 and a number of packet data network (PDN) gateways (PDN-GWs) 215. Each of the MME/SGW devices 205 may implement both a mobile management entity (MME) and a serving gateway (SGW), as defined by the Evolved Packet System (EPS) architecture standardized by the 3GPP organization. Alternatively, the MMEs and SGWs may be implemented by separate devices. The MME may be the control node that processes the signaling between the UE 115-a and the evolved packet core 130-a. Generally, the MME may provide bearer and connection management. The MME may, therefore, be responsible for idle mode UE 115-a tracking and paging, bearer activation and deactivation, and SGW selection for the UE 115-a. The MME may additionally authenticate the UE 115-a and implement Non-Access Stratum (NAS) signaling with the UE 115-a. All user IP packets may be transferred through the SGWs, which may be connected to the PDN-GW 215. The SGW may reside in the user plane and act as a mobility anchor for inter-eNB handovers and handovers between different access technologies.

The packet data network gateways (PDN-GWs) 215 may provide connectivity to one or more external packet data networks (PDNs), such as IP network 235. The PDN-GW 215 may provide UE IP address allocation as well as other functions. The PDN(s) may include the Internet, an Intranet, an IP Multimedia Subsystem (IMS), a Packet-Switched (PS) Streaming Service (PSS), and/or other types of PDNs.

As discussed above, the eNB 105-a may access the evolved packet core 130-a directly by communicating with the MME/SGW devices 205. The WLAN access point 105-b may access the evolved packet core 130-a through the evolved packet data gateway (ePDG) 210, which may be configured to secure data transmission with UEs 115-a connected over non-3GPP access. Thus, the ePDG may act as a termination node of IPsec tunnels associated with the UE 115-a.

As shown in FIG. 2, the UE 115-a may access the evolved packet core 130-a and, by extension, the IP network 235 through either an LTE wireless link 125-a with eNB 105-a or a WLAN wireless link 125-b with the WLAN access point 105-b. In certain examples, the UE may aggregate the LTE wireless link 125-a with the WLAN wireless link 125-b such that the WLAN wireless link 125-b may carry packets related to LTE bearers. The UE 115-a may perform uplink WLAN scheduling on a periodic and/or aperiodic basis to increase the overall uplink throughput between the UE 115-a and the evolved packet core 130-a. This scheduling may be based at least in part on the state (e.g., congestion, rate, modulation type, channel quality, availability of uplink grant or access, etc.) of the LTE wireless link 125-a in comparison to the state of the WLAN wireless link 125-b. The UE 115-a may schedule the transmission of packets related to one or more LTE bearers over the WLAN wireless link 125-b to, for example, increase the speed or efficiency of communications between the UE 115-a and the evolved packet core 130-a.

Figure 3:
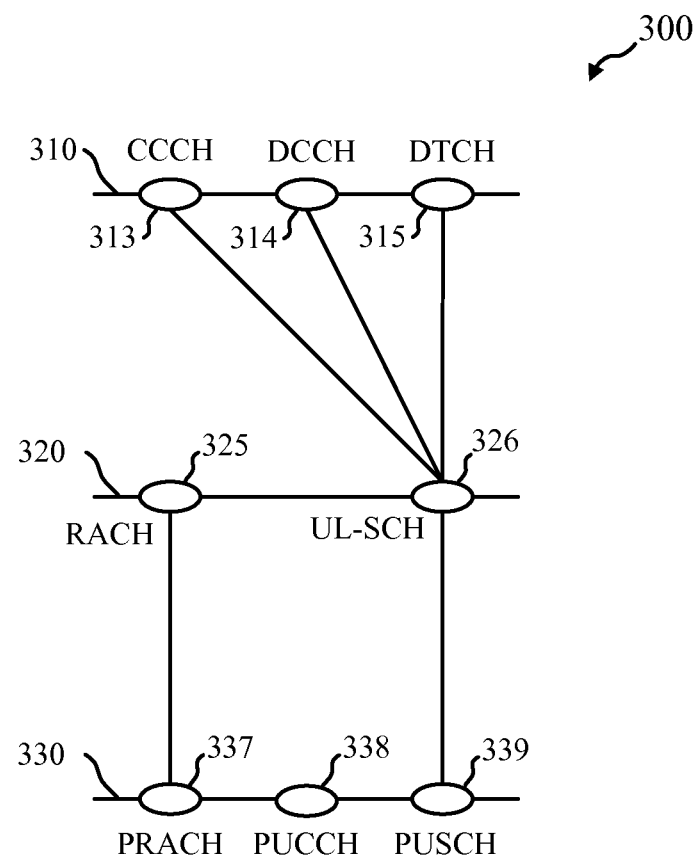
FIG. 3 shows a diagram of illustrative uplink channels in a wireless communications system.

FIG. 3 illustrates a channelization hierarchy 300 for uplink communications between a UE 115 and an evolved packet core 130 that may be used by the wireless communications system 100 and/or 200 in accordance with various examples.

The channelization hierarchy 300 may illustrate, for example, channel mapping between logical channels 310, uplink transport channels 320, and uplink physical channels 330 for an LTE/A network. The logical channels 310 may include a common control channel (CCCH) 313, a dedicated control channel (DCCH) 314, and a dedicated traffic channel (DTCH) 315. The CCCH 313 may be used to transmit control information between UEs 115 and the network when the UEs 115 have no RRC connection with the network. The DCCH 314 may be a point-to-point bi-directional channel that transmits dedicated control information between a UE 115 having an RRC connection and the network. The DTCH 315 may be a point-to-point channel dedicated to a UE 115 for the transfer of user information. uplink transport channels 320 may include a random access channel (RACH) 325, and an uplink shared data channel (UL-SCH) 326. The uplink physical channels 330 may include at least one of a physical random access channel (PRACH) 337, a physical uplink control channel (PUCCH) 338, and a physical uplink shared channel (PUSCH) 339.

Figure 4:
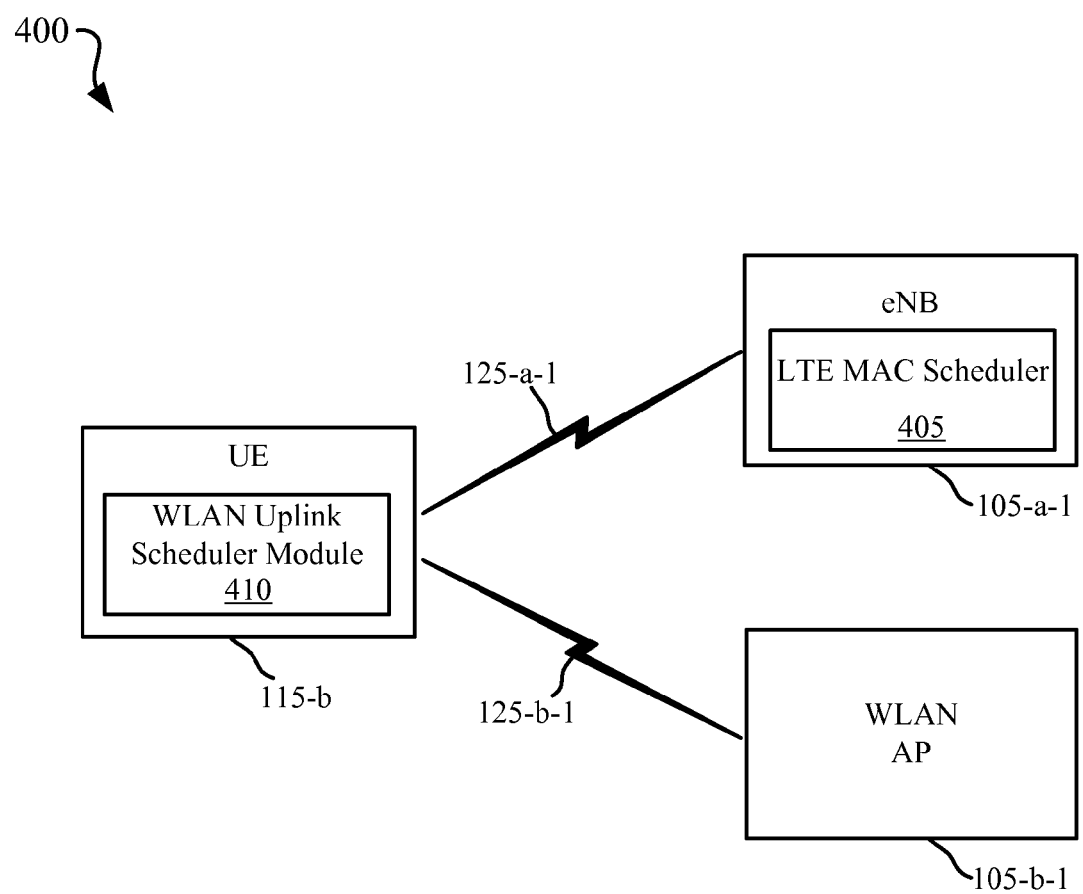
FIG. 4 shows a block diagram of an example of a wireless communications system.

FIG. 4 is a block diagram of another wireless communications system 400 that includes a UE 115-a-1 communicatively coupled with eNB 105-a-1 over LTE wireless link 125-a-1 and WLAN access point 105-b-1 over WLAN wireless link 125-b-1. The wireless communications system 400 of FIG. 4 may be an example of one or more of the wireless communications system 100, 200 described above with reference to the previous Figures.

As shown in FIG. 4, different nodes may manage the scheduling of uplink communications from the UE 115-b for different radio access technologies (RATs). Specifically, the eNB 105-a-1 may include a medium access control (MAC) scheduler module 405 configured to schedule uplink resources for the UE 115-a-1 over the LTE wireless link 125-a-1. The UE 115-b may include a WLAN uplink scheduler module 410 configured to schedule uplink transmissions for the UE 115-b over the WLAN wireless link 125-b-1. As discussed previously, the UE 115-b may transmit packets for LTE bearers over both the LTE wireless link 125-*a*-1 and the WLAN wireless link 125-*b*-1 at the same time.

Scheduling of uplink data for transmission over the LTE links by the eNB 105-*a*-1 may advantageous since the UE 115-*b* may lack information about the channel conditions, buffers, and/or the presence of other UEs 115 in the LTE system. Specifically, the eNB 105-*a*-1 may be better equipped to schedule uplink transmissions by the UE 115-*b* over the LTE system in a way that optimizes system throughput and fairness among the UEs based on the information available to it. The eNB 105-*a*-1 may, for example, utilize information received in various reports (e.g., scheduling requests or buffer status reports) from the UE 115-*b* regarding the amount of uplink data the UE 115-*b* has to transmit, and allocate time and frequency resources to the UE 115-*b* according to a fairness algorithm based on the reports of the UE 115-*b* and other UEs 115 connected to the eNB 105-*a*-1.

While the UE 115-*b* may not directly control uplink scheduling over the LTE wireless link 125-*a*-1, the UE 115-*b* may be configured to maximize its own performance by competing for the maximum resources on both the LTE wireless link 125-*a*-1 and the WLAN wireless link 125-*b*-1. In particular, the WLAN uplink scheduler module 410 may implement uplink scheduling based on the state and/or condition of the WLAN and/or LTE wireless links. In some examples, the state of the link may provide information about the availability of a grant or access to the LTE wireless links. According to one example, the WLAN uplink scheduler module 410 may take a "greedy" approach to WLAN uplink scheduling and may feed data incrementally to one or more WLAN transmit buffers based on one or more of: a maximum supportable data rate for the WLAN wireless link 125-*b*-1, the state of the LTE wireless link (e.g. availability of access to the LTE wireless link) 125-*a*-1, and/or estimated service times for the LTE and WLAN wireless links 125-*a*-1, 125-*b*-1.

The WLAN uplink scheduler module 410 may perform uplink scheduling for the UE 115-*b* at each of a plurality of scheduling intervals. The scheduling intervals may be periodic, aperiodic, or both. At each scheduling interval, the WLAN uplink scheduler module 410 may determine an amount of data to push into one or more WLAN transmit buffers of the UE 115-*b* that corresponds to each logical channel implemented in the LTE wireless link 125-*a*-1 between the UE 115-*b* and the eNB 105-*a*-1. In certain examples, the scheduling intervals may be greater than 1 millisecond apart to account for changes in uplink scheduling by the eNB 105-*a*-1 for the LTE wireless link 125-*a*-1. In certain examples, at least a subset of the WLAN scheduling intervals implemented at the UE 115-*b* may coincide or align with LTE scheduling intervals implemented at the eNB 105-*a*-1.

Maintaining a short periodicity for LTE scheduling and WLAN buffer filling may provide for quick adjustments in response to changing channel and loading conditions on one or both of the wireless links 125. For example, as one of the wireless links 125 improves in channel quality or throughput, more data may be pushed through that wireless link 125 (e.g., by requesting more uplink resources for the LTE wireless link 125-*a*-1 from the eNB 105-*a*-1 or by scheduling more data to be transmitted on the WLAN wireless link 125-*b*-1). Thus, the utilization of each wireless link 125 may be based on the relative quality of each wireless link 125. By optimizing the utilization of each wireless link 125 based on the quality of both wireless links 125, the UE 115-*b* may obtain an increased throughput for uplink communications. Additionally, the UE 115-*b* may avoid trapping data into a wireless link 125 of poor quality. For example, if the WLAN wireless link 125-*b*-1 becomes worse, the data flow into the WLAN transmit buffer(s) of the UE 115-*b* may subside until conditions improve.

Figure 5:
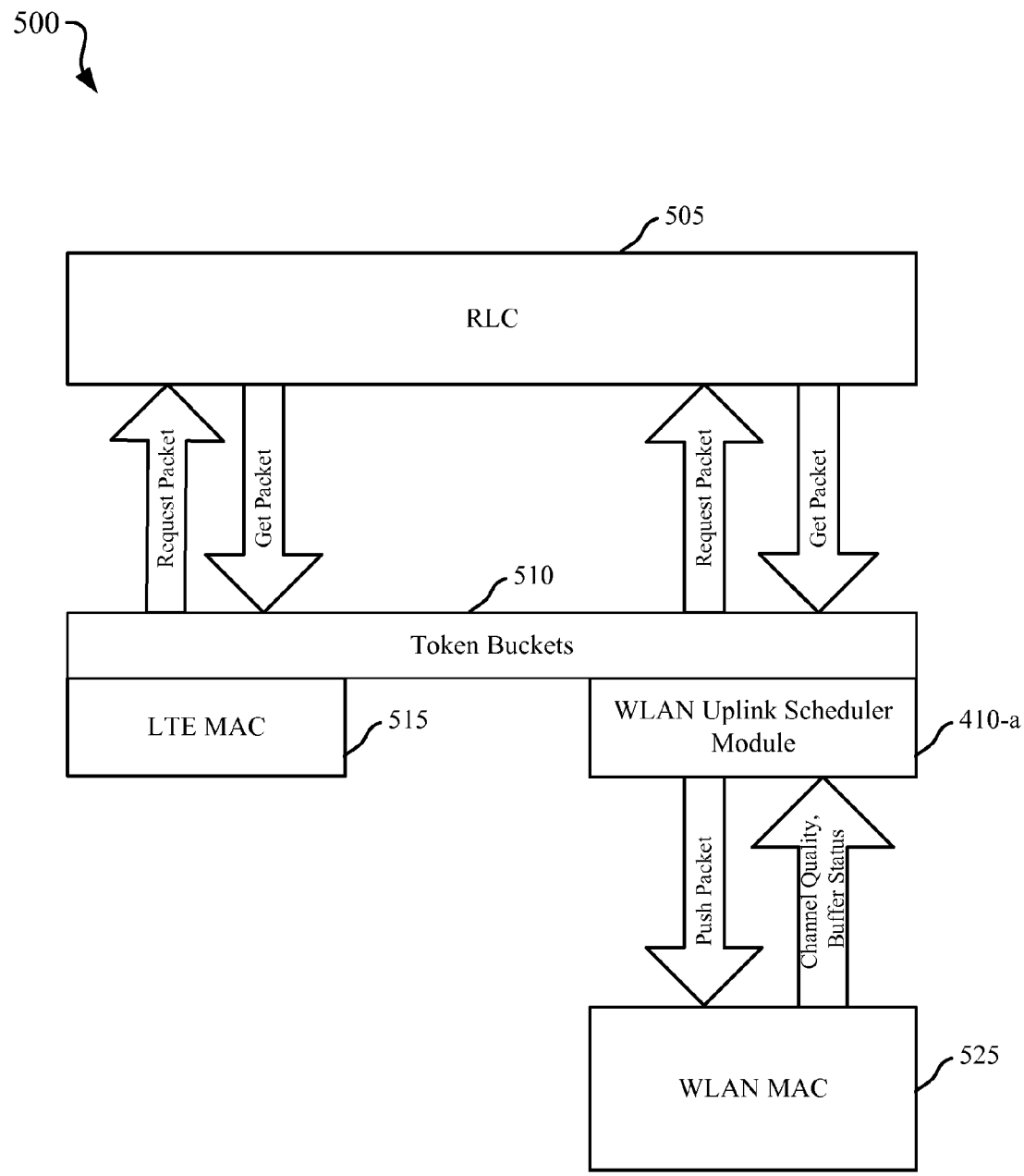
FIG. 5 shows a block diagram of an illustrative distribution of uplink packets between an LTE media access control (MAC) layer and a WLAN MAC layer at a UE.

FIG. 5 is a block diagram 500 of the interactions between various entities of a wireless communications system, such as the wireless communications system 100, 200 or 400 described above with reference to the previous Figures. In particular, FIG. 5 depicts interactions between an aggregating layer and various MAC entities associated with different RATs, as implemented by a UE (e.g., one or more of the UEs 115 of the previous Figures). In the specific example of FIG. 5, the aggregating layer is a radio link control (RLC) layer 505, and the MAC entities are an LTE MAC 515, and a WLAN MAC 525. Unlike in other systems known in the art, in the present example, a single RLC layer 505 may feed protocol data units (PDUs) or packets from upper network and/or application layers of a protocol stack to the lower LTE MAC layer 515 and the WLAN MAC layer 525. According to one implementation, a scheduler of the UE, such as for example, WLAN Uplink Scheduler 410-*a* may coordinate scheduling of the uplink data over one or more of the LTE wireless link and the WLAN wireless link.

According to one example, LTE MAC layer 515 may request and receive packets for uplink transmission on an LTE wireless link from the RLC layer 505 based on a resource grant received from an LTE scheduler. Specifically, a WLAN uplink scheduler module 410-*a* may coordinate scheduling of the uplink data based on the resource grant received from the LTE scheduler so that a portion of the uplink data from the RLC layer is provided to the LTE MAC layer 515 to satisfy the received resource grant. In other words, while the WLAN uplink scheduler may not schedule the uplink transmission on an LTE wireless link, the WLAN uplink scheduler 410-*a* may coordinate the scheduling based on the uplink resources granted by LTE scheduler. The WLAN uplink scheduler module 410-*a* may then schedule the remaining uplink data for transmissions over a WLAN wireless link by selectively requesting and pushing packets from the RLC layer 505 to at least one transmit buffer of the WLAN MAC layer 525. For example, the WLAN uplink scheduler 410-*a* may determine scheduling of the remainder of the uplink data for transmission of the WLAN link based on such factors as a quality of WLAN link, latency, traffic type, etc. In particular, at each WLAN scheduling interval, the WLAN uplink scheduler module 410-*a* may determine, for each of a plurality of logical channels, whether any data from the logical channel is to be pushed to the transmit buffer(s) of the WLAN MAC layer 525. This determination may be based at least in part on a state (e.g. availability of an uplink grant) of the LTE wireless link, and at least in part on a state of the WLAN wireless link. In the event that the WLAN uplink scheduler module 410-*a* determines a non-zero amount of uplink data for a logical channel to be transmitted on the WLAN wireless link, the WLAN uplink scheduler module 410-*a* may request one or more packets from the RLC layer 505 based on the determined amount. In one example, the request may trigger a packet building procedure, such as, for example, a token bucket 510 procedure, in order to build packets for transmission over the WLAN. The WLAN uplink scheduler module 410-*a* may then push the one or more packets received from the RLC layer 505 to the transmit buffer(s) of the WLAN MAC layer 525. The WLAN uplink scheduler module 410-*a* of the present example may be an example of the WLAN uplink scheduler module 410 of FIG. 4.

Figure 6:
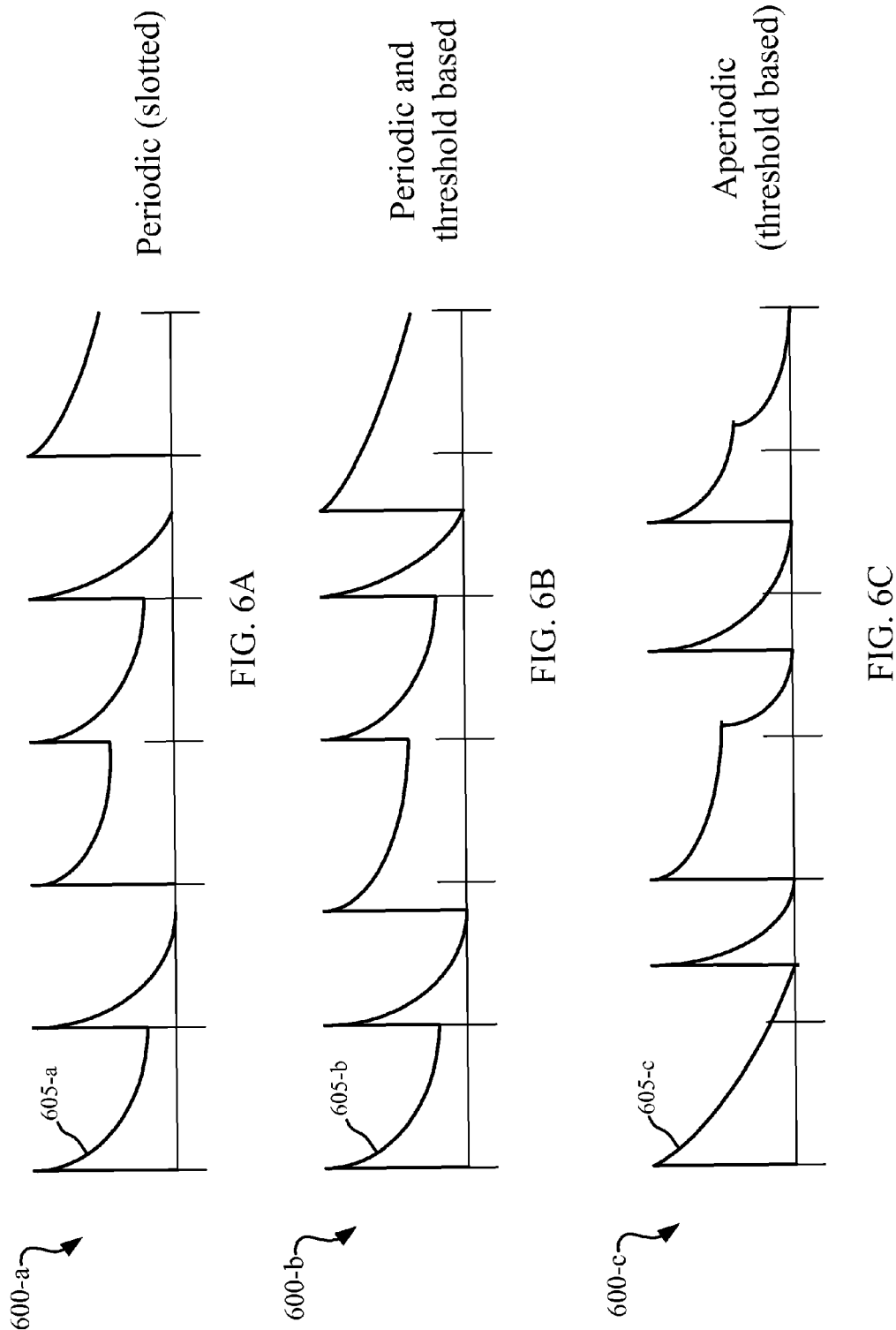
FIGS. 6A-6C show diagrams of illustrative WLAN uplink scheduling intervals at a UE.

Referring now to FIGS. 6A-6C, different examples are shown of scheduling intervals that may be used by a scheduler of the UE. In one example, the scheduling intervals may be WLAN scheduling intervals that may be used by the WLAN uplink scheduler module 410-a of FIG. 5. In these examples, the x axes represent time, the y axes represent the content of a transmit buffer of the WLAN MAC layer 525 of FIG. 5, and plots 605 represent the content of the transmit buffer with respect to the passage of time.

In the example of FIG. 6A, WLAN scheduling intervals may be periodic such that WLAN uplink scheduling may be performed upon the expiration of a set interval period, without regard to the state of the transmit buffer. In the example of FIG. 6B, the WLAN uplink scheduling intervals may be both periodic and threshold or event-based, such that WLAN uplink scheduling occurs at the expiration of each WLAN uplink period, and additionally whenever the content of the WLAN transmit buffer drops to or below a threshold. In the example of FIG. 6C, the WLAN uplink scheduling intervals may strictly threshold or event-based, such that WLAN uplink scheduling occurs whenever the content of the WLAN transmit buffer drops to a threshold (zero, in this example).

Returning to FIG. 5, a more detailed description of the operations of the WLAN uplink scheduler module 410-a will now be given. Resource assignment performed by the WLAN uplink scheduler module 410-a may determine a tentative amount of data to put into the one or more WLAN transmit buffers of the WLAN MAC layer 525. This amount may be based on current channel conditions (including loading) of the WLAN wireless link and the leftover data in a WLAN transmit buffer from the previous scheduling instance (i.e., data that was not transmitted from the WLAN transmit buffer in the previous scheduling instance). Upon determining the tentative amount of data to put into the WLAN transmit buffer(s), the WLAN uplink scheduler module 410-a may then determine whether to schedule any of the tentative amount of data for WLAN transmission based on the conditions of the LTE wireless link and the WLAN wireless link.

To aid in the discussion, $T_{sch}$ may be defined as a scheduling time window. That is, $T_{sch}$ is the time period of a WLAN uplink scheduling interval. $T_{sch}$ may represent both the time period between consecutive WLAN uplink scheduling operations and the period of time to which the scheduling is directed. In certain examples, $T_{sch}$ may be multiplied by a scaling coefficient, $\alpha$ that may be used to tune a maximum buffer threshold as discussed below. $R_{est}$ may be defined as an estimated current data rate of the WLAN wireless link based on channel quality, an estimated maximum data rate for a modulation and coding scheme (MCS) in use, and loading on the WLAN wireless link. In certain examples, the UE may include multiple WLAN transmit buffers with different Quality of Service (QoS) parameters. Thus, $R_{est}$ may be defined for each of the WLAN transmit buffers of the UE. It will be understood that multiple logical channels may be mapped to a single WLAN transmit buffer. $B_{curr,tot}$ may be defined as a current size or utilization of an individual WLAN transmit buffer, taking into account all logical channel mappings to that particular WLAN transmit buffer. $B_{max,tot}$ may be defined as a maximum allowable buffer size or utilization for a given WLAN transmit buffer. $B_{min,tot}$ may be defined as a minimum buffer depth threshold for a given WLAN transmit buffer. $B_{max}$ may be defined as a maximum buffer threshold for a given logical channel. $B_{WiFi}$ may be defined as an amount of new data for a given logical channel to be pushed into a WLAN transmit buffer associated with that logical channel. $B_{avail}$ may represent an amount of data available for transmission from a given logical channel.

Given these parameters, the estimated data rate $R_{est,k}$ for the $k^{th}$ WLAN transmit buffer may be calculated as:

$$R_{est,k}(t) = l^k(t) * R_{max}(t), \text{ where}$$

$$l^k(t) = (1-\beta) * l^k(t-1) + \beta * l^k_{est}(t), \text{ where}$$

$$l^k_{est}(t) = \frac{B^k_{Tx}(t)/T}{R_{max}(t)}$$

where $l_{est}^k(t)$ is an estimated loading coefficient, $B_{Tx}^k(t)$ is the amount of data transmitted for the $k^{th}$ WLAN transmit buffer within the time interval T, and $R_{max}$ is a maximum achievable data rate given current channel conditions and the current modulation and coding scheme.

Where a periodic WLAN uplink scheduling timeline is employed, the WLAN uplink scheduler module 410-a may perform the following tasks at every $T_{sch}$ interval. The WLAN uplink scheduler module 410-a may first check if LTE scheduling coincides with WLAN uplink scheduling in the current scheduling instance. If the LTE scheduling does coincide with the WLAN uplink scheduling, LTE scheduling may be performed first by the LTE MAC layer 515 by building RLC packets based on granted resources and a token bucket 510 procedure.

Once the LTE scheduling has concluded, or if the LTE scheduling does not coincide with the WLAN uplink scheduling, the WLAN uplink scheduler module 410-a may perform a series of calculations for each logical channel i, beginning with a highest priority logical channel and ending with a lowest priority logical channel, where the $i^{th}$ logical channel belongs to the $k_{th}$ WLAN transmit buffer. These calculations may include determining the delay $(t_{i-1})$ within the scheduling window attributable to a scheduled logical channel immediately preceding the current logical channel as follows:

$$t_{i-1} = \frac{B_{WiFi,i-1}}{R_{est,k}}$$

A time, $T_{sch\_taken}$, representing the total delay due to previously queued logical channels may then be updated as follows:

$$T_{sch\_taken} = T_{sch\_taken} + t_{i-1}$$

For the very first scheduling in a scheduling instance, $T_{sch\_taken}$ may be set to $T_{sch\_taken}\ t_{-1}$, where $t_{-1}$ may be the estimated delay due to queued data left over from the previous scheduling instance across all logical channels.

$B_{max,i}$ may then be calculated for the current logical channel as follows:

$$B_{max,i} = R_{est,k} * \max((T_{sch} * \alpha - T_{sch\_taken}), 0)$$

The coefficient $\alpha$ may be used to tune the maximum buffer value for the current logical channel i. An $\alpha$ that is larger than 1 may result in a buffer size overestimate, which may be utilized to prevent buffer underflow and compensate for latencies in WLAN buffer updates (e.g., due to ACK latency). A $B_{max,i}$ of 0 may indicate that there is not more room in $T_{sch}$ for uplink scheduling, and flow may terminate.

Figure 7:
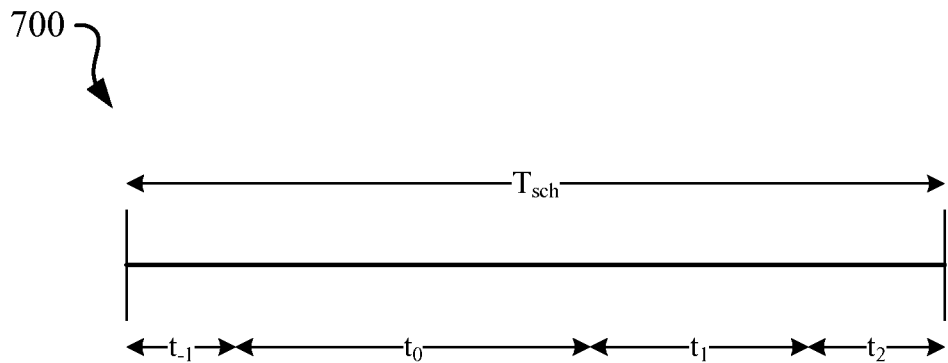
FIG. 7 is a block diagram of an illustrative WLAN uplink scheduling interval at a UE.

FIG. 7 shows a diagram of a WLAN uplink scheduling window 700 in which $T_{sch}$ is full from the time $t_{-1}$ occupied by the left over buffer from the previous scheduling window and the time $t_0$, $t_1$, and $t_2$ scheduled for the three highest priority logical channels. Thus, in the example of FIG. 7, the $B_{max}$ for the fourth highest priority logical channel would be equal to 0.

Returning to the discussion of FIG. 5, if the $B_{max,i}$ of the current logical channel i is greater than 0, an upper limit may be set on the $B_{max,i}$ (i.e. the $B_{max,i}$ may be capped) as follows to take into account the amount of data or number of packets provisioned for transmission from the current logical channel i and a maximum total buffer threshold of the WLAN transmit buffer associated with the current logical channel:

$$B_{max,i} = \min(B_{max,i}, B_{max,tot}^k - B_{curr,tot}^k)$$

The value of $B_{curr,tot}^k$ may be updated each time uplink data from one of the logical channels is scheduled or pushed into the WLAN transmit buffer associated with that logical channel. The initial value of $B_{curr,tot}^k$ for a scheduling window may be the leftover buffer from the previous scheduling window.

Once the upper bound (i.e. cap) for the $B_{max,i}$ value has been calculated for the current logical channel, a tentative amount, $B_{WiFi,i}$, of data to push into the WLAN transmit buffer associated with the current logical channel may be calculated as follows:

$$B_{WiFi,i} = \min(B_{max,i}, \text{token bucket level})$$

where token bucket level may represent the amount of data that the WLAN transmit buffer associated with the current logical channel i is permitted to receive based on a fairness algorithm implemented by token buckets 510.

Once $B_{WiFi,i}$ has been calculated, the WLAN uplink scheduler module 410-a may determine a priority between LTE and WLAN for the $B_{WiFi,i}$ from the current logical channel i. This prioritization may be based on a current state or condition of at least the LTE wireless link. If the WLAN uplink scheduler module 410-a determines that the data is to be transmitted over the WLAN wireless link based on the prioritization, the $B_{WiFi,i}$ amount of data for the current logical channel i may be requested from the RLC layer 505 and pushed into the WLAN transmit buffer associated with the current logical channel i at the WLAN MAC layer 525.

The use of prioritization between LTE and WLAN may avoid increasing the total packet delay due to the delay of data submitted to the WLAN transmit buffer (i.e., not eligible for transmission on LTE). The prioritization may be beneficial in cases where the amount of data to be transmitted is limited and the estimated delay for the period of time during which the WLAN transmit buffer is filled is larger than the expected delay on LTE to transmit all data available for transmission. In certain examples, the prioritization between the LTE and WLAN may be implemented by first determining, for the current logical channel i, the parameters $d1_{LTE,i}$ and $d2_{LTE,i}$, as follows:

$$d1_{LTE,i} = \frac{B_{tot,i}}{R_{LTE,i}}$$

$$d2_{LTE,i} = \frac{B_{tot,i} - B_{WiFi,i}}{R_{LTE,i}}$$

where $d1_{LTE,i}$ may be defined as an estimated delay associated with transmitting all available data from the current logical channel i on LTE without using WLAN, $d2_{LTE,i}$ may be defined as an estimated delay associated with transmitting the total data available for transmission from the current logical channel i on LTE, as discounted by the potential transmission of $B_{WiFi,i}$ on WLAN, $R_{LTE,i}$ may be defined as an estimated serving data rate on LTE, $B_{tot,i}$ may be defined as the total data available for transmission at the RLC layer 505 for the current logical channel i, and $B_{WiFi,i}$ may represent the tentative amount of data to be pushed into the WLAN transmit buffer associated with the current logical channel.

In the present example, if $d2_{LTE,i} > t_{Wifi,i}$, where $t_{Wifi,i} = \Sigma_{j=-1}^{i} t_j$ may represent an expected delay due already scheduled higher priority logical channels, the $B_{WiFi,i}$ bits from the current logical channel i may be pushed into the WLAN transmit buffer associated with the current logical channel i. In the event that $d2_{LTE,i} < t_{Wifi,i}$ and $d1_{LTE,i} < t_{Wifi,i}$, the $B_{WiFi,i}$ bits may not be pushed into the WLAN transmit buffer, and the bits may be transmitted over LTE. In the event that $d2_{LTE,i} < t_{Wifi,i}$ and $d1_{LTE,i} > t_{Wifi,i}$, the $B_{WiFi,i}$ bits from the current logical channel i may be pushed into the WLAN transmit buffer associated with the current logical channel i.

As discussed above, this process may be repeated for each of the logical channels, in order of priority. Accordingly, a $B_{WiFi}$ may be determined for each of the logical channels, in order of priority, until the buffer is full. For each logical channel with a nonzero $B_{WiFi}$ value, the WLAN uplink scheduler module 410-a may determine a priority between LTE and WLAN for the $B_{WiFi}$ calculated for that logical channel.

Figure 8:
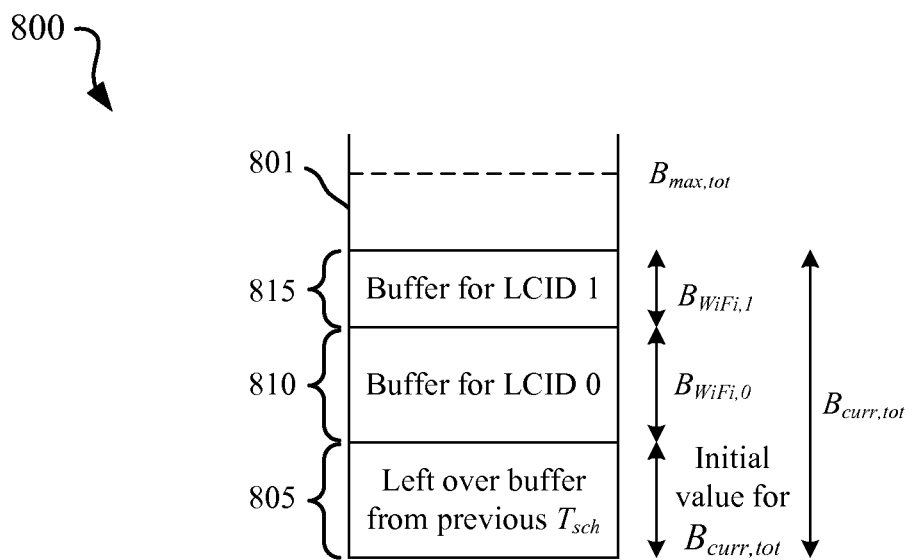
FIG. 8 is a block diagram of an illustrative WLAN transmit buffer at a UE.

FIG. 8 illustrates a block diagram of a WLAN transmit buffer 800 following completion of the described iterative process. The WLAN transmit buffer 800 may include data 805 left over from the previous scheduling window, data 810 from logical channel LCID 0, and data 815 from logical channel LCID 1. Thus, the current size of the buffer, $B_{curr,tot}$ may be the combination of the data 805, 810, 815. However, as shown in FIG. 8, additional room 801 may be present in the WLAN transmit buffer 800 after determining an initial amount of data to push to the WLAN transmit buffer 800 for each logical channel associated with that WLAN transmit buffer 800. In certain examples, further steps may be taken to push additional data from the logical channels into the WLAN transmit buffer 800.

For example, returning to the discussion of FIG. 5, if $T_{sch\_taken} < T_{sch} * \alpha$ the WLAN uplink scheduler module 410-a may iterate again through the logical channels associated with the WLAN transmit buffer, according to priority, to determine a tentative amount of new data to push into the WLAN transmit buffer for each logical channel until $T_{sch\_taken} = T_{sch} * \alpha$ or $T_{sch\_taken}$ approaches $T_{sch} * \alpha$ within a certain threshold. The tentative amount of new data to push to the WLAN transmit buffer for the ith logical channel may be computed as follows:

$$B_{max,i} = \min(B_{max,i}, B_{avail,i}, B_{max,tot} - B_{curr,tot}^k)$$

For each tentative amount of new data computed for a logical channel, the previously described process of prioritizing between LTE and WLAN may be employed to determine whether to use LTE or WLAN to transmit the tentative amount of new data computed for that logical channel. In the event that the WLAN uplink scheduler module 410-a determines to push the tentative amount of new data to the WLAN transmit buffer, the value of $T_{sch\_taken}$ may be updated, and the WLAN uplink scheduler module 410-*a* may continue iterating through the logical channels until $T_{sch\_taken} = T_{sch} * \alpha$.

Figure 9:
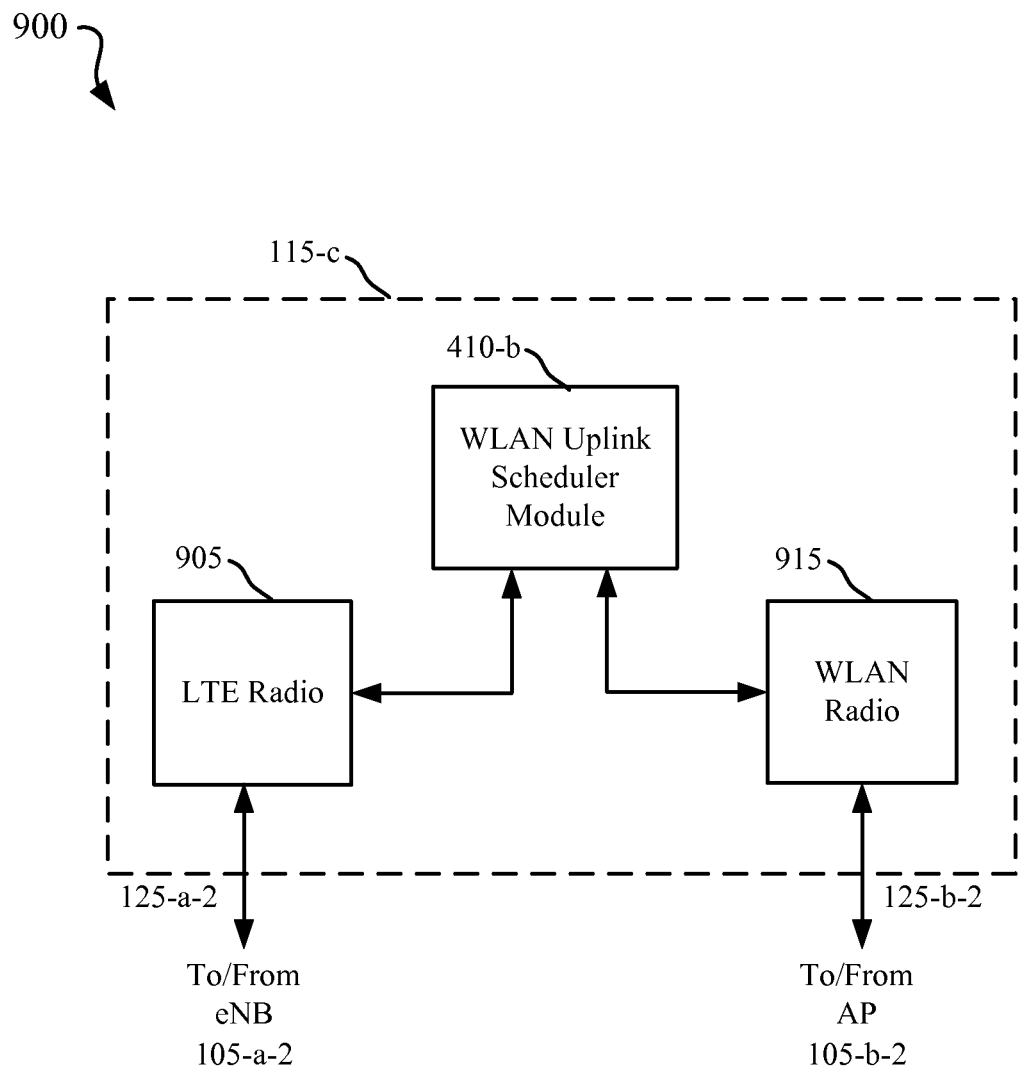
FIG. 9 is a block diagram of an illustrative UE.

Referring now to FIG. 9, a block diagram 900 of an example UE 115-*c* is shown. The UE 115-*c* may be an example of one or more of the UEs described above with reference to the previous Figures. The UE 115-*c* may include an LTE radio 905, a WLAN uplink scheduler module 410-*b*, and a WLAN radio 915. Each of these components may be in direct or indirect communication with one another. Although the discussion of the figure is presented with relation to the LTE and WLAN technologies, other RATs could be used in their place.

In the example shown, the LTE radio 905 may be configured to communicate with an eNB 105-*a*-2 over an LTE wireless link 125-*a*-2, and the WLAN radio 915 may be configured to communicate with a WLAN access point 105-*b*-2 over a WLAN wireless link 125-*b*-2. The WLAN uplink scheduler module 410-*b* may be configured to schedule uplink data from one of the layers of the UE 115-*c* for transmission over either the WLAN wireless link 125-*b*-2 or LTE wireless link 125-*a*-2. As discussed previously, the scheduling of data from the same layer of the UE 115-*c* for transmission over both the WLAN wireless link 125-*b*-2 or the LTE wireless link 125-*a*-2 may be referred to as a link aggregation. In one example, the layer from which data may be scheduled for transmission, may be a radio link control (RLC) layer. In such case, the packets generated at the RLC layer may be scheduled for transmission over one of the two links based on an information available to the UE regarding, for example, the state of the links. As described above with reference to the process of prioritizing between WLAN and LTE in FIG. 5, scheduling of the uplink data may be based at least in part on a state (e.g., channel conditions, loading, modulation and coding scheme, etc.) of the LTE wireless link 125-*a*-2. Alternatively or in addition, the scheduling may be based at least in part on a state of the WLAN wireless link 125-*b*-2.

According to one example, the WLAN radio 915 may be configured to transmit a first portion of the uplink data from one of the layers of the UE over the WLAN wireless link 125-*b*-2 during the scheduling window in accordance with the link aggregation between the WLAN wireless link 125-*b*-2 and the LTE wireless link 125-*a*-2. In case the UE 115-*c* receives a grant to uplink resources over the LTE wireless link 125-*a*-2 during the scheduling window, the LTE radio 905 may be configured to transmit a second portion of the uplink data over the LTE link during the scheduling window in accordance with the grant and the aggregation of the WLAN and LTE wireless links.

As discussed above, in certain examples the WLAN uplink scheduler module 410-*b* may be configured to determine if the WLAN uplink scheduling window coincides or aligns with a grant of uplink resources for the LTE wireless link 125-*a*-2 by the eNB 105-*a*-2. In response to this determination, the WLAN uplink scheduler module 410-*b* may be configured to trigger the packet build procedure to build one or more packets for transmission over the LTE wireless link 125-*a*-2 according to the grant before scheduling the first portion of the uplink data to transmit over the WLAN wireless link 125-*b*-2.

As further discussed above, scheduling the first portion of the data over the WLAN wireless link 125-*b*-2 may entail determining a maximum estimated buffer size for each of a plurality of logical channels associated with the uplink data and determining an amount of the uplink data to transmit over the WLAN wireless link 125-*b*-2 during the scheduling window for each of the logical channels based at least in part on the maximum estimated buffer size determined for that logical channel. In certain examples, the maximum estimated buffer size for each of the logical channels may be based at least in part on an estimated data transmit rate of a WLAN transmit buffer associated with that logical channel and/or, a time within the scheduling window occupied by at least another one of the logical channels. The estimated data transmit rate of the WLAN transmit buffer may be based on at least one or more of: a set of channel conditions for the WLAN wireless link, an availability of wireless resources for the WLAN wireless link, a current loading of the WLAN wireless link, or an error rate associated with the WLAN wireless link. Additionally or alternatively, determining the maximum estimated buffer size for each of the logical channels may include determining that the maximum estimated buffer size of at least one of the logical channels is equal to zero; and refraining from scheduling uplink data from the at least one of the logical channels to transmit over the WLAN wireless link 125-*b*-2 during the scheduling window.

The WLAN uplink scheduler module 410-*c* may be configured to cap the maximum estimated buffer size determined for at least one of the logical channels based on at least one or more of: an amount of data or number of packets provisioned for transmission from the at least one of the logical channels and a maximum total threshold of a WLAN transmit buffer associated with the at least one of the logical channels. A stored value of the amount of uplink data available from each one of the logical channels may be updated in response to scheduling uplink data from that one of the logical channels for transmission over the WLAN wireless link 125-*b*-2.

In certain examples, the WLAN uplink scheduler module 410-*c* may determine a tentative amount of the uplink data to push into a WLAN transmit buffer of the UE 115-*c* for each one of the logical channels based on the determined maximum estimated buffer size for that one of the logical channels and a token bucket level associated with that WLAN buffer. The WLAN uplink scheduler module 410-*b* may then determine whether to transmit the tentative amount of the uplink data for each one of the logical channels over the WLAN wireless link 125-*b*-2 based on a prioritization between the LTE wireless link 125-*a*-2 and the WLAN wireless link 125-*b*-2 associated with that one of the logical channels during the scheduling window.

As discussed in more detail above, the prioritization between the WLAN wireless link 125-*b*-2 and the LTE wireless link 125-*a*-2 may be determined for each of the logical channels during the scheduling window based on a difference in a total estimated delay of transmitting a total amount of available data for that logical channel over the LTE wireless link 125-*a*-2 and a total estimated delay of transmitting the total amount of available data over the aggregation of the LTE wireless link 125-*a*-2 and the WLAN wireless link 125-*b*-2, according to the determined tentative amount.

In certain examples, the WLAN uplink scheduler module 410-*b* may determine a priority among the logical channels. The maximum estimated buffer size and the amount of the uplink data to transmit over the WLAN wireless link 125-*b*-2 during the scheduling window may be determined for each of the logical channels in an order of priority among the logical channels.

As discussed above, following a first iteration through the logical channels for WLAN uplink scheduling to schedule the first portion of the uplink data for transmission over the WLAN wireless link 125-b-2, the WLAN uplink scheduler module 410-b may determine that an estimated amount of resources associated with a current amount of data in at least one WLAN transmit buffer is less than a given threshold. An example of the resources may be time. Accordingly, the WLAN uplink scheduler module 410-b may schedule a new amount of the uplink data to transmit over the WLAN wireless link for at least one of the logical channels according to a priority of that one of the logical channels and a difference between the threshold and the estimated amount of time associated with the current amount of data.

In certain examples, the WLAN uplink scheduler module 410-b may move the first portion of the uplink data from the RLC layer of the UE 115-c to at least one WLAN transmit buffer of the UE 115-c. In certain examples, the size of the scheduling may be greater than a frame length of the LTE wireless link (e.g., greater than 1 millisecond). In certain examples, the WLAN uplink scheduler module 410-b may perform uplink WLAN scheduling following a determination that a time period of the scheduling window has expired, a determination that a size of at least one WLAN buffer of the UE 115-c has crossed a threshold, or both.

Figure 10:
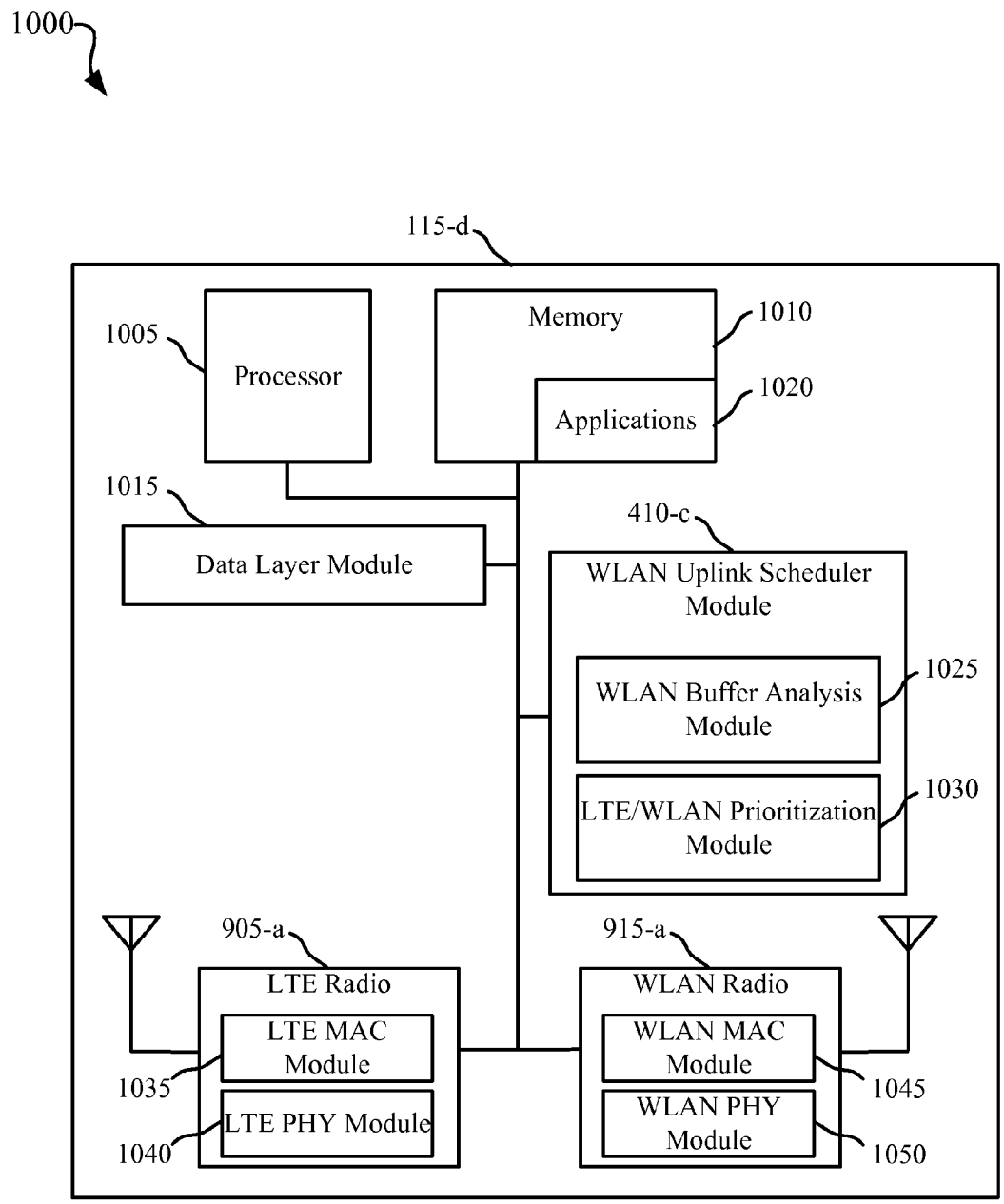
FIG. 10 is a block diagram of an illustrative UE.

Referring now to FIG. 10, a block diagram 1000 of another example UE 115-d is shown. The UE 115-d may be an example of one or more of the UEs 115 described above with reference to the previous Figures. The UE 115-d may include at least one processor 1005, memory 1010, an Data Layer module 1015, a WLAN uplink scheduler module 410-c, an LTE radio 905-a, and a WLAN radio 915-a. Each of these components may be in communication, directly or indirectly with one another. In certain examples, the processor 1005 may be configured to execute computer-readable program code stored on the memory 1010 to execute one or more of the functions associated with the Data Layer module 1015, the WLAN uplink scheduler module 410-c, the LTE radio 905-a, and the WLAN radio 915-a. Additionally or alternatively, one or more functions associated with these components may be implemented by ASICs or other special- or general-purpose hardware arranged and interconnected to perform the functionality associated with each component.

The LTE radio 905-a may include an LTE MAC module 1035 and a LTE PHY module 1040 configured to implement the MAC and PHY network layers of an LTE wireless link. Likewise, the WLAN radio 915-a may include a WLAN MAC module 1045 and a WLAN PHY module 1050 configured to implement the MAC and PHY network layers of a WLAN wireless link. The Data Layer module 1015 may implement a single layer that feeds packets from applications 1020 and/or higher network layers to both the LTE radio 905-a and the WLAN radio 915-a. The LTE MAC layer implemented by the LTE MAC module 1035 may prepare the received packets for uplink transmission by the LTE PHY module 1040 on the LTE PHY layer. The WLAN uplink scheduler module 410-c may selectively request packets from the layer implemented by the Data Layer module 1015 for distribution to the WLAN MAC layer implemented by the WLAN MAC module 1045 and transmission over the WLAN PHY layer by the WLAN PHY module 1050.

The WLAN uplink scheduler module 410-c may perform the functionality described above with reference one or more of the WLAN uplink scheduler modules 410 of the previous Figures. In the present example, the WLAN uplink scheduler module 410-c may include a WLAN buffer analysis module 1025 configured to track a current size of one or more WLAN transmit buffers and determine, for each of a number of logical channels, a tentative amount of data from the RLC module to push to one of the WLAN transmit buffers for transmission during a scheduling window. An LTE/WLAN prioritization module 1030 may determine whether to push the tentative amount of uplink data determined for each logical channel into the WLAN transmit buffer associated with that logical channel for the current scheduling window. As discussed above, this determination may be made based at least in part on a current state of the LTE wireless link and/or the state of the WLAN wireless link.

Figure 11:
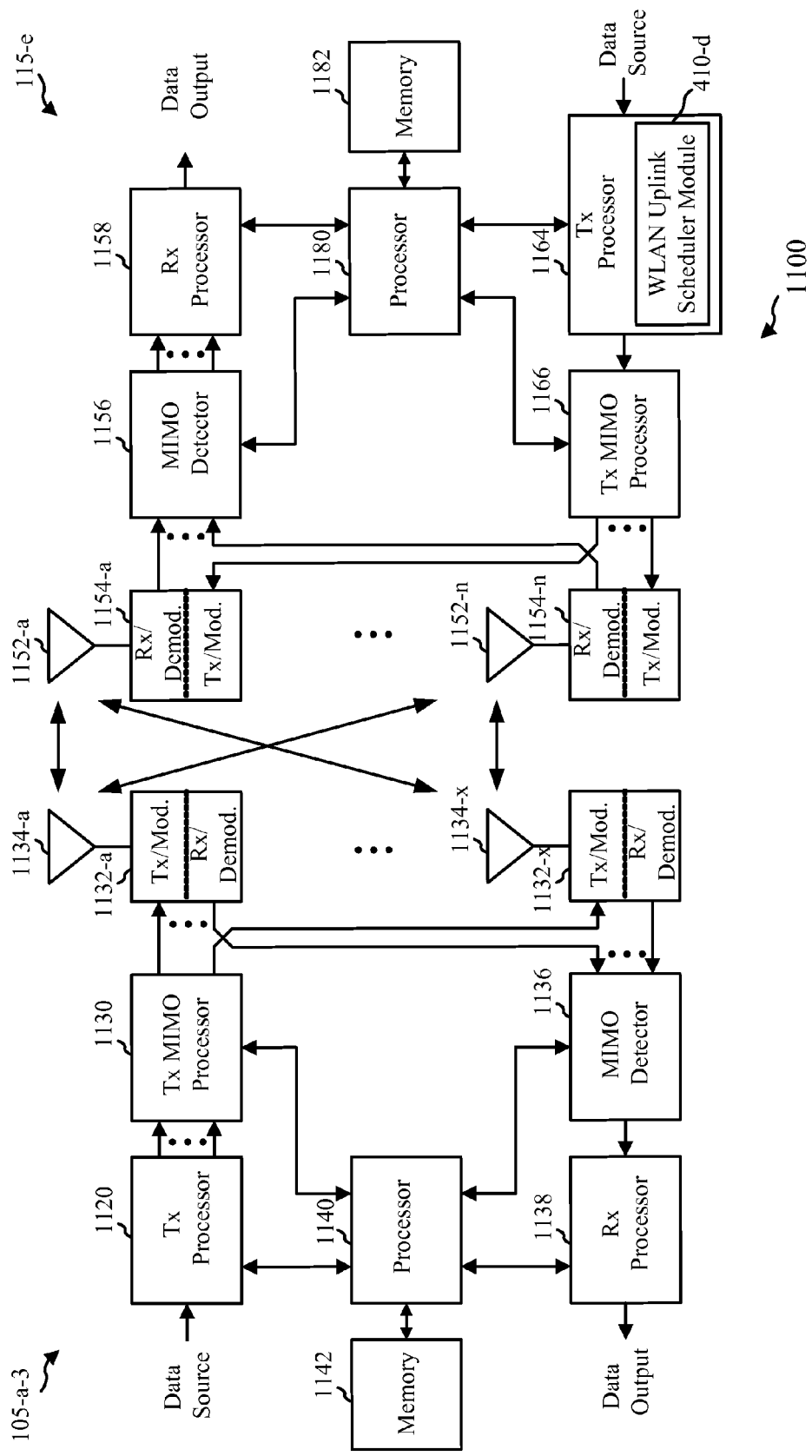
FIG. 11 is a block diagram of an example of a wireless communications system.

FIG. 11 is a block diagram of a wireless communications system 1100 including a eNB 105-a-3 and a UE 115-e. This wireless communications system 1100 may illustrate aspects of the wireless communications system 100 of FIG. 1 and/or the wireless communications system 200 of FIG. 2. The eNB 105-a-3 may be equipped with antennas 1134-a through 1134-x, and the UE 115-e may be equipped with antennas 1152-a through 1152-n. In the wireless communications system 1100, the eNB 105-a-3 may be able to send data over multiple communication links at the same time. Each communication link may be called a "layer" and the "rank" of the communication link may indicate the number of layers used for communication. For example, in a 2×2 MIMO system where eNB 105-a-3 transmits two "layers," the rank of the communication link between the eNB 105-a-3 and the UE 115-e is two.

At the eNB 105-a-3, a transmit processor 1120 may receive data from a data source. The transmit processor 1120 may process the data. The transmit processor 1120 may also generate reference symbols, and a cell-specific reference signal. A transmit (Tx) MIMO processor 1130 may perform spatial processing (e.g., precoding) on data symbols, control symbols, and/or reference symbols, if applicable, and may provide output symbol streams to the eNB modulator/demodulators 1132-a through 1132-x. Each eNB modulator/demodulator 1132 may process a respective output symbol stream (e.g., for OFDM, etc.) to obtain an output sample stream. Each eNB modulator/demodulator 1132 may further process (e.g., convert to analog, amplify, filter, and upconvert) the output sample stream to obtain a downlink (DL) signal. In one example, DL signals from the eNB modulator/demodulators 1132-a through 1132-x may be transmitted via the antennas 1134-a through 1134-x, respectively.

At the UE 115-e, the antennas 1152-a through 1152-n may receive the DL signals from the eNB 105-a and may provide the received signals to the UE modulator/demodulators 1154-a through 1154-n, respectively. Each UE modulator/demodulator 1154 may condition (e.g., filter, amplify, down-convert, and digitize) a respective received signal to obtain input samples. Each UE modulator/demodulator 1154 may further process the input samples (e.g., for OFDM, etc.) to obtain received symbols. A MIMO detector 1156 may obtain received symbols from all the UE modulator/demodulators 1154-a through 1154-n, perform MIMO detection on the received symbols if applicable, and provide detected symbols. A receive processor 1158 may process (e.g., demodulate, deinterleave, and decode) the detected symbols, providing decoded data for the UE 115-e to a data output, and provide decoded control information to a processor 1180, or memory 1182.

On the uplink (UL), at the UE 115-e, a transmit processor 1164 may receive and process data from a data source. The transmit processor 1164 may also generate reference symbols for a reference signal. The symbols from the transmit processor 1164 may be precoded by a transmit MIMO processor 1166 if applicable, further processed by the UE modulator/demodulators 1154-*a* through 1154-*n* (e.g., for SC-FDMA, etc.), and be transmitted to the eNB 105-*a*-3 in accordance with the transmission parameters received from the eNB 105-*a*-3. Consistent with the foregoing principles, the transmit processor 1164 may include a WLAN uplink scheduler module 410-*d* configured to schedule a first portion of uplink data from a RLC layer of the UE 115-*e* to transmit over a WLAN wireless link during a scheduling window, the scheduling based at least in part on a state of the LTE wireless link. The first portion of the uplink data may be transmitted over a WLAN radio, and a remaining second portion of the uplink data may be transmitted over the UE modulator/demodulators 1154.

At the eNB 105-*a*-3, the UL signals from the UE 115-*e* may be received by the antennas 1134, processed by the eNB modulator/demodulators 1132, detected by a MIMO detector 1136 if applicable, and further processed by a receive processor. The receive processor 1138 may provide decoded data to a data output and to the processor 1140. The components of the UE 115-*e* may, individually or collectively, be implemented with one or more Application Specific Integrated Circuits (ASICs) adapted to perform some or all of the applicable functions in hardware. Each of the noted modules may be a means for performing one or more functions related to operation of the wireless communications system 1100. Similarly, the components of the eNB 105-*a*-3 may, individually or collectively, be implemented with one or more Application Specific Integrated Circuits (ASICs) adapted to perform some or all of the applicable functions in hardware. Each of the noted components may be a means for performing one or more functions related to operation of the wireless communications system 1100.

The communication networks that may accommodate some of the various disclosed embodiments may be packet-based networks that operate according to a layered protocol stack. For example, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. At the Physical layer, the transport channels may be mapped to Physical channels.

Figure 12:
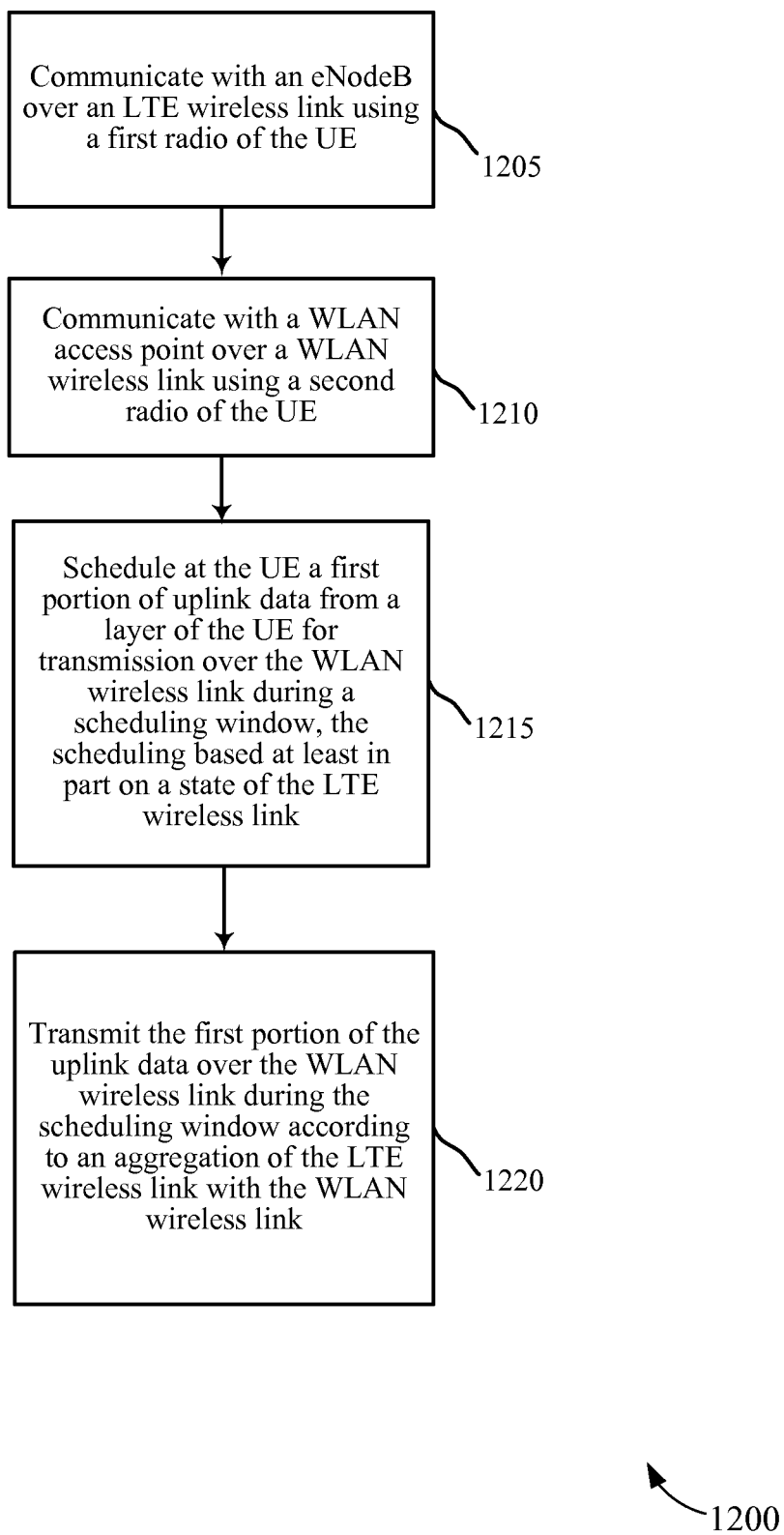
FIG. 12 is a flowchart of a method for managing uplink transmissions of a UE.

FIG. 12 is a flow chart of an illustrative method 1200 of managing uplink transmissions of a UE in a wireless communication system. The method 1200 may be performed, for example, by one or more of the UEs 115 described above with reference to the previous Figures.

At block 1205, the UE may communicate with an eNB over an LTE wireless link using a first radio of the UE. At block 1210, the UE may communicate with a WLAN access point over a WLAN wireless link using a second radio of the UE. At block 1215, the UE may schedule a first portion of uplink data from a layer of the UE to transmit over the WLAN wireless link during a scheduling window, the scheduling based at least in part on a state of the LTE wireless link. At block 1220, the UE may transmit the first portion of the uplink data over the WLAN wireless link during the scheduling window according to an aggregation of the LTE wireless link with the WLAN wireless link. In examples where the UE has been granted uplink resources for the LTE wireless link during the scheduling window, the UE may transmit a second portion of the uplink data from the layer of the UE over the LTE wireless link during the scheduling window according to the aggregation of the LTE and WLAN wireless links.

Figure 13:
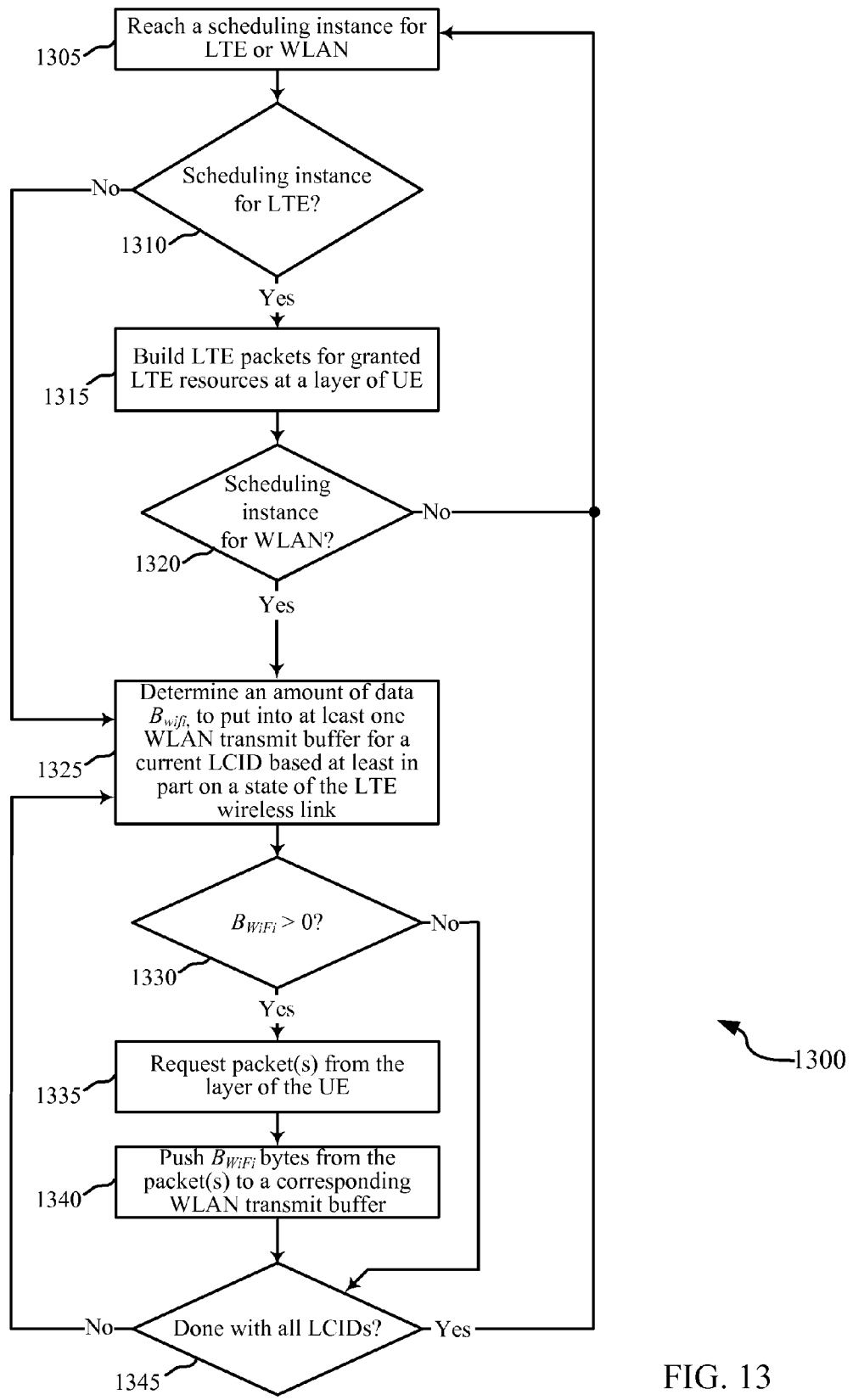
FIG. 13 is a flowchart of a method for managing uplink transmissions of a UE.

FIG. 13 is a flow chart of another illustrative method 1300 of managing uplink transmissions of a UE in a wireless communication system. The method 1300 may be performed, for example, by one or more of the UEs 115 described above with reference to the previous Figures. The method 1300 may be an example of a process for scheduling at the UE a first portion of uplink data from a layer of the UE to transmit over the WLAN wireless link during a scheduling window, according to block 1215 of FIG. 12.

At block 1305, a scheduling instance for LTE or WLAN uplink scheduling may be reached. The scheduling instance for the WLAN uplink scheduling may be periodic, threshold or event-based, or a combination of periodic and threshold or event-based, as discussed above. At block 1310, the UE may determine whether the current scheduling instance is a scheduling instance for LTE. In the event that the current scheduling instance is an LTE scheduling instance (block 1310, Yes), the UE may build LTE packets at a layer of the UE for granted LTE resources at block 1315. At block 1320, a determination may be made as to whether the current scheduling instance is also a scheduling instance for WLAN. If not (block 1320, No), flow may return to block 1305.

If the current scheduling instance is a scheduling instance for WLAN (block 1310, No, or block 1320, Yes), at block 1325 an amount of data, $B_{WiFi}$, to be put into at least one WLAN transmit buffer for a current logical channel may be determined based at least in part on a state of the LTE wireless link. At block 1330, a determination may be made as to whether $B_{WiFi}$ is greater than zero. If so (block 1330, Yes), one or more packets may be requested at block 1335 from the layer of the UE, and the WLAN transmit buffer associated with the current logical channel may be filled with $B_{WiFi}$ bytes from the packets. If $B_{WiFi}$ is not greater than zero (block 1330, No), or following the pushing of bytes into the WLAN transmit buffer at block 1340, a determination may be made at block 1345 as to whether the analysis of blocks 1325 through blocks 1340 has been conducted for each of the logical channels. If not (block 1345, No), a next priority logical channel may become the current logical channel, and flow may return to block 1325. Once the process is completed for all logical channels (block 1345, Yes), flow may return to block 1305.

Figure 14:
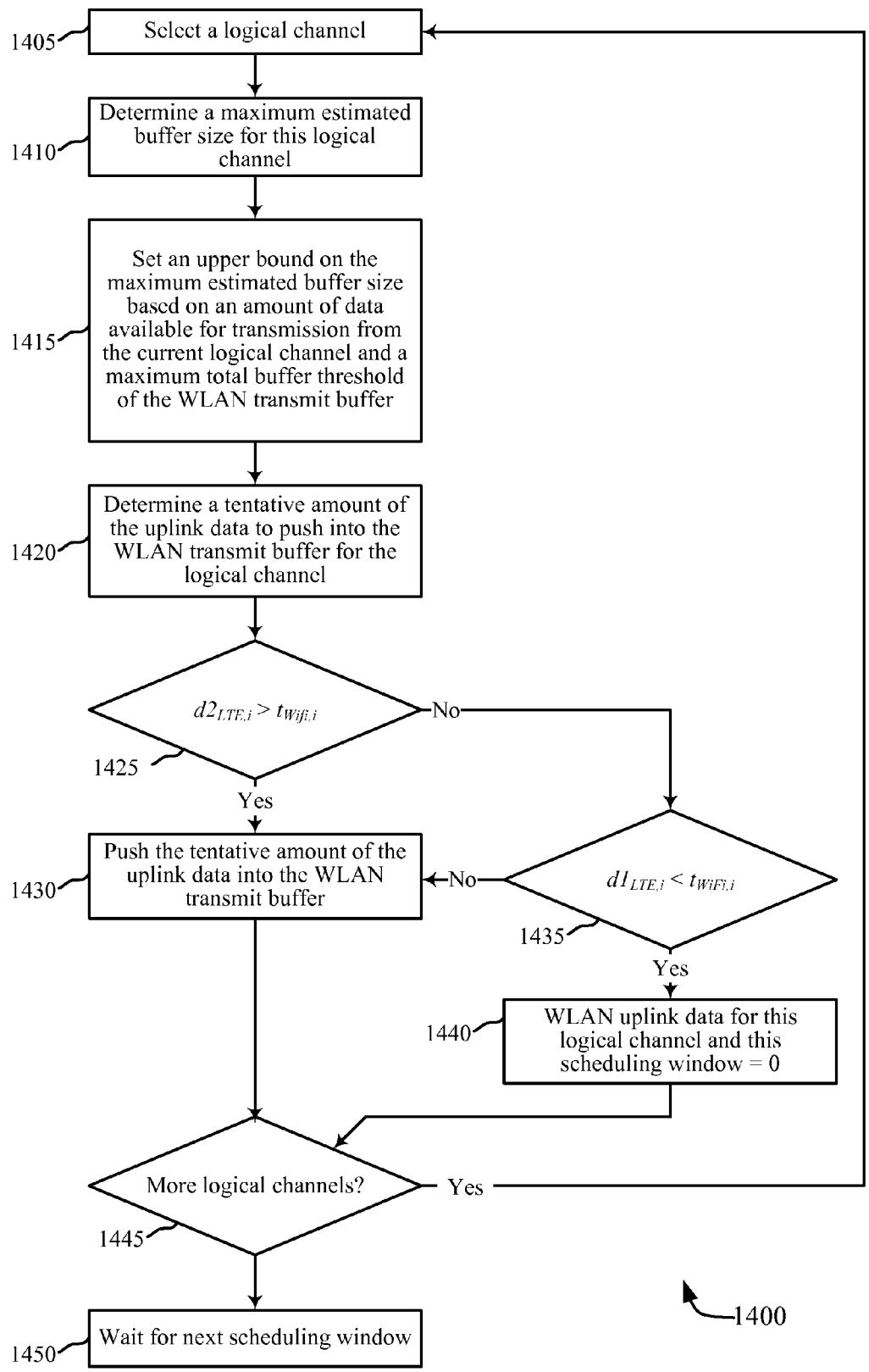
FIG. 14 is a flowchart of a method for managing uplink transmissions of a UE.

FIG. 14 is a flow chart of another illustrative method 1400 of managing uplink transmissions of a UE in a wireless communication system. The method 1400 may be performed, for example, by one or more of the UEs 115 described above with reference to the previous Figures. The method 1400 may be an example of a process for determining an amount of data, $B_{WiFi}$, to push into at least one WLAN transmit buffer (e.g., k) for a number of logical channels of the UE, according to block 1325 through 1340 of FIG. 13.

At block 1405, a current logical channel (i) may be selected. The current logical channel (i) may be associated with one or more specific WLAN transmit buffers (k). At block 1410, a maximum estimated buffer size for the current logical channel (e.g., $B_{max,i}$) may be determined. At block 1415, an upper bound (i.e. cap) may be set for the maximum estimated buffer size based on an amount of data available for transmission from the current logical channel and a maximum total buffer threshold of the WLAN transmit buffer.

At block 1420, a tentative amount of uplink data (e.g., $B_{WiFi,i}$) to push into the WLAN transmit buffer for the logical channel may be determined. At block 1425, a determination may be made as to whether an estimated delay ($d2_{LTE,i}$) on LTE for the total available data for transmission, as discounted by the potential transmission of the tentative amount over the WLAN wireless link, is greater than an expected delay ($t_{WiFi,i}$) due to uplink data already scheduled for WLAN transmission for higher priority logical channels. If so (block 1425, Yes), the tentative amount of the uplink data (e.g., $B_{WiFi,i}$) may be pushed into the WLAN transmit buffer at block 1430. Otherwise (block 1425, No), a determination may be made as to whether an estimated delay on LTE ($d1_{LTE,i}$) for the total data available for transmission from the current logical channel, without using WLAN, is less than the expected delay ($t_{WiFi,i}$) due to uplink data already scheduled for WLAN transmission for higher priority logical channels. If $d1_{LTE,i}$ is greater than $t_{WiFi,i}$ (block 1435, No), the tentative amount of the uplink data (e.g., $B_{WiFi,i}$) may be pushed into the WLAN transmit buffer at block 1430. Otherwise (block 1435, Yes), no uplink data may be scheduled for transmission over the WLAN wireless link, according to block 1440.

At block 1445, a determination may be made as to whether additional logical channels remain for analysis. If additional logical channels remain (block 1445, Yes), flow may return to block 1405, where a next highest priority logical channel may be selected. Otherwise, flow may proceed to block 1450, at which the UE may await a next scheduling window.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of managing uplink transmissions of a user equipment (UE), the method comprising:
   communicating with an evolved NodeB (eNB) over a Long-Term Evolution (LTE) wireless link using a first radio of the UE;
   communicating with a wireless local area network (WLAN) access point over a WLAN wireless link using a second radio of the UE;
   scheduling at the UE a first portion of uplink data from an aggregating layer of the UE for transmission over the WLAN wireless link during a scheduling window, the scheduling based at least in part on availability of access to the LTE wireless link, and wherein the scheduling comprises:
      determining a maximum estimated buffer size for each of a plurality of logical channels associated with the uplink data; and
      determining an amount of the uplink data to transmit over the WLAN wireless link during the scheduling window for each of the logical channels, the amount based at least in part on the maximum estimated buffer size determined for that logical channel; and
   transmitting the first portion of the uplink data over the WLAN wireless link during the scheduling window according to an aggregation of the LTE wireless link with the WLAN wireless link, wherein the aggregation of the LTE wireless link with the WLAN wireless link comprises transmitting the uplink data from the aggregating layer of the UE over the LTE wireless link and the WLAN wireless link.

2. The method of claim 1, wherein the aggregating layer is coupled to a first media access control (MAC) entity associated with the LTE wireless link and a second MAC entity associated with the WLAN wireless link and provides the uplink data to the first MAC entity and the second MAC entity.

3. The method of claim 1, wherein the aggregating layer is coupled to a scheduler of the UE which coordinates scheduling of the uplink data over one or more of the LTE wireless link and the WLAN wireless link.

4. The method of claim 1, wherein the aggregating layer comprises an Radio Link Control (RLC) layer of the UE.

5. The method of claim 1 further comprising:
   transmitting a second portion of the uplink data from the aggregating layer of the UE over the LTE wireless link during the scheduling window according to the aggregation of the LTE wireless link with the WLAN wireless link.

6. The method of claim 1, further comprising:
   determining that the scheduling window coincides with a grant of uplink resources for the LTE wireless link by the eNB; and
   building at least one packet at the aggregating layer of the UE for transmission over the LTE wireless link according to the grant before the scheduling the first portion of the uplink data for transmission over the WLAN wireless link, wherein the building is in response to a determination that the scheduling window coincides with the grant of uplink resources for the LTE wireless link.

7. The method of claim 1, further comprising:
   setting an upper bound on the maximum estimated buffer size determined for at least one of the logical channels based on a maximum total buffer threshold of the WLAN transmit buffer and at least one or more of: an amount of data provisioned for transmission from the at least one of the logical channels or a number of packets provisioned for transmission from the at least one of the logical channels.

8. The method of claim 1, further comprising:
   determining a tentative amount of the uplink data to push into a WLAN transmit buffer of the UE for each one of the logical channels based on the determined maximum estimated buffer size for that one of the logical channels and a token bucket level associated with that WLAN buffer; and
   determining whether to transmit the tentative amount of the uplink data for each one of the logical channels over the WLAN wireless link based on a prioritization between the LTE wireless link and the WLAN wireless link associated with that one of the logical channels during the scheduling window.

9. The method of claim 8, further comprising:
   determining the prioritization between the WLAN wireless link and the LTE wireless link for each of the logical channels during the scheduling window based on a difference in a total estimated delay of transmitting a total amount of available data for that logical channel over the LTE wireless link and a total estimated delay of transmitting the total amount of available data over the aggregation of the LTE wireless link and the WLAN wireless link according to the determined tentative amount.

10. The method of claim 1, further comprising:
    adding the first portion of the uplink data from the aggregating layer of the UE to at least one WLAN transmit buffer of the UE.

11. The method of claim 1, further comprising:
    determining that a time period of the scheduling window has expired; and
    determining that a size of at least one WLAN buffer of the UE has crossed a threshold;
    wherein the scheduling the first portion of the uplink data to transmit over the WLAN wireless link occurs in response to expiration of the scheduling window time period or in response to the size of the at least one WLAN buffer crossing the threshold.

12. An apparatus for managing uplink transmissions of a user equipment (UE), the apparatus comprising:
    means for communicating with an evolved NodeB (eNB) over a Long-Term Evolution (LTE) wireless link;

means for communicating with a wireless local area network (WLAN) access point over a WLAN wireless link;

means for scheduling at the UE a first portion of uplink data from an aggregating layer of the UE for transmission over the WLAN wireless link during a scheduling window, the scheduling based at least in part on availability of access to the LTE wireless link, and wherein the scheduling means comprises:

means for determining a maximum estimated buffer size for each of a plurality of logical channels associated with the uplink data; and means for determining an amount of the uplink data to transmit over the WLAN wireless link during the scheduling window for each of the logical channels, the amount based at least in part on the maximum estimated buffer size determined for that logical channel; and means for transmitting the first portion of the uplink data over the WLAN wireless link during the scheduling window according to an aggregation of the LTE wireless link with the WLAN wireless link; wherein the aggregation of the LTE wireless link with the WLAN wireless link comprises transmitting the uplink data from the aggregating layer of the UE over both the LTE wireless link and the WLAN wireless link.

13. The apparatus of claim 12, wherein the aggregating layer is coupled to a first media access control (MAC) entity associated with the LTE wireless link and a second MAC entity associated with the WLAN wireless link and provides the uplink data to the first MAC entity and the second MAC entity.

14. The apparatus of claim 12, wherein the aggregating layer is coupled to a scheduler of the UE which coordinates scheduling of the uplink data over one or more of the LTE wireless link and the WLAN wireless link.

15. The apparatus of claim 12, wherein the aggregating layer comprises an Radio Link Control (RLC) layer of the UE.

16. The apparatus of claim 12, further comprising:
means for transmitting a second portion of the uplink data from the aggregating layer of the UE over the LTE wireless link during the scheduling window according to the aggregation of the LTE wireless link with the WLAN wireless link.

17. The apparatus of claim 12, further comprising:
means for determining that the scheduling window coincides with a grant of uplink resources for the LTE wireless link by the eNB; and means for building of at least one packet at the aggregating layer of the UE for transmission over the LTE wireless link according to the grant before the scheduling the first portion of the uplink data to transmit over the WLAN wireless link, wherein the building is in response to a determination that the scheduling window coincides with the grant of uplink resources for the LTE wireless link.

18. The apparatus of claim 12, further comprising:
means for setting an upper bound on the maximum estimated buffer size determined for at least one of the logical channels based on a maximum total buffer threshold of the WLAN transmit buffer and at least one or more of: an amount of data provisioned for transmission from the at least one of the logical channels or a number of packets provisioned for transmission from the at least one of the logical channels.

19. The apparatus of claim 12, further comprising:
means for determining a tentative amount of the uplink data to push into a WLAN transmit buffer of the UE for each one of the logical channels based on the determined maximum estimated buffer size for that one of the logical channels and a token bucket level associated with that WLAN buffer; and means for determining whether to transmit the tentative amount of the uplink data for each one of the logical channels over the WLAN wireless link based on a prioritization between the LTE wireless link and the WLAN wireless link associated with that one of the logical channels during the scheduling window.

20. The apparatus of claim 19, further comprising:
means for determining the prioritization between the WLAN wireless link and the LTE wireless link for each of the logical channels during the scheduling window based on a difference in a total estimated delay of transmitting a total amount of available data for that logical channel over the LTE wireless link and a total estimated delay of transmitting the total amount of available data over the aggregation of the LTE wireless link and the WLAN wireless link according to the determined tentative amount.

21. The apparatus of claim 12, further comprising:
means for adding the first portion of the uplink data from the aggregating layer of the UE to at least one WLAN transmit buffer of the UE.

22. A user equipment (UE), comprising:
a first radio configured to communicate with an evolved NodeB (eNB) over a Long-Term Evolution (LTE) wireless link;

a second radio configured to communicate with a wireless local area network (WLAN) access point over a WLAN wireless link;

a scheduler configured to:
schedule a first portion of uplink data from an aggregating layer of the UE for transmission over the WLAN wireless link during a scheduling window, the scheduling based at least in part on an availability of access to the LTE wireless link;

determine a maximum estimated buffer size for each of a plurality of logical channels associated with the uplink data; and determine an amount of the uplink data to transmit over the WLAN wireless link during the scheduling window for each of the logical channels, the amount based at least in part on the maximum estimated buffer size determined for that logical channel; and wherein the first radio is further configured to transmit the first portion of the uplink data over the WLAN wireless link during the scheduling window according to an aggregation of the LTE wireless link with the WLAN wireless link at the aggregating layer, the aggregation of the LTE wireless link with the WLAN wireless link being operative for transmission of the uplink data over the LTE wireless link and the WLAN wireless link.

23. The user equipment of claim 22, wherein the aggregating layer is coupled to a first media access control (MAC) entity associated with the LTE wireless link and a second MAC entity associated with the WLAN wireless link and provides the uplink data to the first MAC entity and the second MAC entity.

24. The user equipment of claim 23, wherein the aggregating layer comprises an Radio Link Control (RLC) layer of the UE.

25. The user equipment of claim 22, wherein the second radio is further configured to transmit a second portion of the uplink data from the aggregating layer of the UE over the LTE wireless link during the scheduling window according to the aggregation of the LTE wireless link with the WLAN wireless link.

26. The user equipment of claim 22, wherein the scheduler is further configured to:
  determine that the scheduling window coincides with a grant of uplink resources for the LTE wireless link by the eNB; and
  cause at least one packet to be built at the aggregating layer of the UE for transmission over the LTE wireless link according to the grant before the scheduling the first portion of the uplink data to transmit over the WLAN wireless link, wherein the building is in response to a determination that the scheduling window coincides with the grant of uplink resources for the LTE wireless link.

27. A computer program product, comprising:
  a non-transitory computer readable medium comprising computer-readable program code stored thereon, the computer-readable program code comprising:
  computer-readable program code configured to cause at least one processor to communicate with an eNodeB (eNB) over an LTE wireless link using a first radio of the UE;
  computer-readable program code configured to cause the at least one processor to communicate with a wireless local area network (WLAN) access point over a WLAN wireless link using a second radio of the UE;
  computer-readable program code configured to cause the at least one processor to:
  schedule at the UE a first portion of uplink data from an aggregating layer of the UE for transmission over the WLAN wireless link during a scheduling window, the scheduling based at least in part on availability of access to the LTE wireless link;
  determine a maximum estimated buffer size for each of a plurality of logical channels associated with the uplink data; and
  determine an amount of the uplink data to transmit over the WLAN wireless link during the scheduling window for each of the logical channels, the amount based at least in part on the maximum estimated buffer size determined for that logical channel; and
  computer-readable program code configured to cause the at least one processor to transmit the first portion of the uplink data over the WLAN wireless link and a second portion of the uplink data over the LTE wireless link during the scheduling window according to an aggregation of the LTE wireless link with the WLAN wireless link, wherein the aggregation of the LTE wireless link with the WLAN wireless link comprises transmitting the uplink data from the aggregating layer of the UE over the LTE wireless link and the WLAN wireless link.

* * * * *